(12) United States Patent
Chakraborty et al.

(10) Patent No.: US 10,754,500 B2
(45) Date of Patent: Aug. 25, 2020

(54) ELECTRONIC APPARATUS AND METHOD FOR PROVIDING FLUID USER INTERFACE

(71) Applicant: Samsung Electronics Co., Ltd., Suwon-si, Gyeonggi-do (KR)

(72) Inventors: Tuhin Chakraborty, Bangalore (IN); Saumitri Choudhury, Bangalore (IN); Sanjay Ghosh, Bangalore (IN); Kiran Prasanth Rajan, Bangalore (IN); Rahul Laishram, Bangalore (IN); Swati Kujur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 15/290,624

(22) Filed: Oct. 11, 2016

(65) Prior Publication Data
US 2017/0102856 A1  Apr. 13, 2017

(30) Foreign Application Priority Data

Oct. 9, 2015 (IN) ............................ 5430/CHE/2015
Sep. 29, 2016 (IN) ............................ 5430/CHE/2015

(51) Int. Cl.
| | | |
|---|---|---|
| G06F 3/0481 | (2013.01) | |
| G06F 3/0484 | (2013.01) | |
| G06F 3/0488 | (2013.01) | |
| G06F 3/0482 | (2013.01) | |
| G06F 3/0486 | (2013.01) | |

(52) U.S. Cl.
CPC ........ *G06F 3/04817* (2013.01); *G06F 3/0481* (2013.01); *G06F 3/0482* (2013.01);
(Continued)

(58) Field of Classification Search
CPC ............ G06F 3/04817; G06F 3/04812; G06F 3/0486; G06F 3/0484; G06F 3/04845;
(Continued)

(56) References Cited

U.S. PATENT DOCUMENTS 6,310,631 B1 * 10/2001 Cecco ................... G06F 3/0481
715/792
2008/0040692 A1 * 2/2008 Sunday ............... G06F 3/04883
715/863
(Continued)

FOREIGN PATENT DOCUMENTS

KR  10-2011-0030093 A  3/2011

OTHER PUBLICATIONS

European Examination Report dated Feb. 21, 2020, issued in European Patent Application No. 16853958.3.

*Primary Examiner* — Stephen S Hong
*Assistant Examiner* — Ahamed I Nazar
(74) *Attorney, Agent, or Firm* — Jefferson IP Law, LLP

(57) ABSTRACT

An electronic device to provide a fluid user interface (UI) and a method thereof are provided. The electronic device includes a display configured to display at least one first icon, an inputter configured to receive a user command to select the at least one first icon and move the at least one first icon to another area of the display, and at least one processor configured to control the display to determine a duration to receive the user command and determine a moving distance of the user command, and display at least one second icon located around the at least one first icon based on the duration and the moving distance.

20 Claims, 19 Drawing Sheets

(52) U.S. Cl.
CPC .......... *G06F 3/0484* (2013.01); *G06F 3/0486* (2013.01); *G06F 3/04812* (2013.01); *G06F 3/04845* (2013.01); *G06F 3/04883* (2013.01); *G06T 2210/24* (2013.01)

(58) Field of Classification Search
CPC .. G06F 3/0481; G06F 3/0482; G06F 3/04883; G06T 2210/24
See application file for complete search history.

(56) References Cited

U.S. PATENT DOCUMENTS

| | | | |
|---|---|---|---|
| 2008/0229222 A1* | 9/2008 | Kake | G06F 3/0481 715/764 |
| 2009/0307631 A1 | 12/2009 | Kim et al. | |
| 2011/0025632 A1 | 2/2011 | Lee | |
| 2011/0205171 A1* | 8/2011 | Akiyoshi | G06F 3/04883 345/173 |
| 2012/0137258 A1* | 5/2012 | Sudo | G06F 3/0486 715/863 |
| 2012/0297342 A1 | 11/2012 | Jang et al. | |
| 2013/0212529 A1 | 8/2013 | Amarnath | |
| 2014/0089832 A1* | 3/2014 | Kim | G06F 3/0481 715/769 |
| 2014/0304665 A1* | 10/2014 | Holz | G06F 3/017 715/863 |
| 2015/0212711 A1* | 7/2015 | Adams | G06F 3/04883 715/863 |
| 2015/0286380 A1* | 10/2015 | Mak | G06F 3/041 715/800 |

* cited by examiner

ELECTRONIC APPARATUS AND METHOD FOR PROVIDING FLUID USER INTERFACE

CROSS-REFERENCE TO RELATED APPLICATION(S)

This application claims the benefit under 35 U.S.C. § 119(a) of an Indian provisional patent application filed on Oct. 9, 2015 in the Indian Intellectual Property Office and assigned Serial number 5430/CHE/2015, and of an Indian patent application filed on Sep. 29, 2016 in the Indian Intellectual Property Office and assigned Serial number 5430/CHE/2015, the entire disclosure of each of which is hereby incorporated by reference.

TECHNICAL FIELD

The present disclosure relates to a user interface (UI). More particularly, the present disclosure relates to an electronic apparatus and a method for providing flexibility in an action confirmation using a fluid UI element.

BACKGROUND

User interface (UI) elements enable only discrete interactions, e.g., a button is pressed or swiped to trigger one particular action. However, a mental model of users works through fuzzy states while making a decision. Therefore, the UI elements should align to this mental model of the users and allow them flexibility to modify the decision while interacting with the UI or user experience (UX) elements.

The UI elements do not provide relevant information and options to improvise upon interaction goal, e.g., while receiving a call the user might want to turn ON a speaker, which should be displayed upfront as an option while accepting the call.

The UI elements do not adapt to different contexts, e.g., a widget to accept/reject call renders same interaction behavior during an incoming call from a close contact or that from an unknown number. However, the level of resistance to respond to the unknown number should be automatically elevated, in alignment with that specific context.

The UI elements do not respond to degrees of user's commitment demonstrated by duration of performing a gesture. In an example, a swipe action trigger does not react to change in speed of swipe. When the user is sure of executing main action, the swipe is fast and the action is triggered. However, when the user is undecided, the user slows down/stops mid-way through the swipe. In such cases, the UI element should provide options for the user to modify goal.

Therefore, a need exists for an electronic apparatus and a method for providing flexibility in an action confirmation using a fluid UI element.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing flexibility in an action confirmation using a fluid user interface (UI) element.

Another aspect of the present disclosure is to provide a method for estimating duration of an interaction with the fluid UI element and an extent of the interaction with the fluid UI element.

Another aspect of the present disclosure is to provide a method for splitting the fluid UI element in response to determining that the estimated duration does not reach a predefined duration threshold and the estimated extent reaches a predefined extent threshold.

Another aspect of the present disclosure is to provide a method for presenting a plurality of action items sequentially at predefined intervals in response to determining that the estimated duration has reached a predefined duration threshold and the estimated extent has not reached a predefined extent threshold.

Another aspect of the present disclosure is to provide a method for causing a deformation in the fluid UI element in accordance with the estimated duration of the interaction with the fluid UI element and the extent of the interaction with the fluid UI element.

Another aspect of the present disclosure is to provide a method for causing the deformation of the UI to bind with a selected item.

Another aspect of the present disclosure is to provide a method for restoring deformation of the UI in absence of the user input on the UI element.

In accordance with an aspect of the present disclosure, an electronic device is provided. The electronic device includes a display configured to display at least one first icon, an inputter configured to receive a user command to select the at least one first icon and move the at least one first icon to another area of the display, and at least one processor configured to control the display to determine a duration to receive the user command and determine a moving distance of the user command, and display at least one second icon located around the at least one first icon based on the duration and the moving distance.

The processor, when the duration is equal to or greater than a predefined duration, and when the moving distance is less than a predefined moving distance, may control the display to deform and display a shape of the first icon which is continued from a start area of selection of the first icon to a last area where the user command is input as a fluid having viscosity.

The least one processor may control the display to sequentially display the at least one second icon according to the duration.

The least one processor may control the display so that, when one of the at least one second icon is selected by the user, the first icon is bound to the selected second icon, and when there are a plurality of the at least one second icon, remaining second icons not selected from among the plurality of second icons disappear.

The least one processor, when the first icon approaches one of the plurality of the second icons by the user, may control the display so that a shape of a second icon adjacent to the first icon is displayed to be different from remaining second icon.

The least one processor may determine pressure which is input to the first icon by the user command, and deform and display the first icon to an icon in a fluid shape having viscosity based on duration to receive a user command and the determined pressure.

The least one processor, when the duration is equal to or greater than a predefined duration, and the determined pressure value is equal to or greater than a predefined pressure value, may control the display to deform and display the first icon as an icon in a fluid type having viscosity so that the first icon is expanded within a designated scope according to the duration.

The least one processor, when an outline of the first icon reaches the designated scope, may control the display so that at least one second icon is sequentially displayed around a first icon which is deformed to the fluid type according to the duration.

The least one processor, when one of the at least one second icon is selected by the user, may control the display so that the first icon is bound to the selected second icon, and when there are a plurality of the at least one second icons, remaining second icons not selected from among the plurality of second icons disappear.

The least one processor, when the duration is equal to or greater than a predetermined first threshold value, and the moving distance is equal to or greater than a predetermined second threshold value, may control the display to display a UI to edit a menu item corresponding to the first icon around a first icon where the user command is input.

In accordance with another aspect of the present disclosure, a UI providing method is provided. The UI providing method includes displaying at least one first icon, receiving a user command to select the at least one first icon and move the at least one first icon to another area of the display, determining a duration to receive the user command and a moving distance of the user command, and deforming and displaying the at least one first icon to an icon in a fluid type having viscosity based on the duration and the moving distance.

The displaying may further include, when the duration is equal to or greater than a predefined duration, and when the moving distance is less than a predefined moving distance, deforming and displaying a shape of the first icon which is continued from a start area of selection of the first icon to a last area where the user command is input as a fluid having viscosity.

The displaying may further include sequentially displaying the at least one second icon around the first icon according to the duration.

The displaying may further include selecting one of the at least one second icon by the user, coupling and displaying the first icon with the selected second icon, and when there are a plurality of the at least one second icon, disappearing remaining second icons not selected from among the plurality of second icons.

The displaying may further include, when the first icon approaches one of the plurality of the second icons by the user, displaying so that a shape of a second icon adjacent to the first icon is displayed to be different from remaining second icon.

The method further includes determining pressure which is input to the first icon by the user command, and deforming and displaying the at least one first icon to an icon in a fluid shape having viscosity based on duration to receive a user command and the determined pressure.

The displaying may further include when the duration is equal to or greater than a predefined duration, and the determined pressure value is equal to or greater than a predefined pressure value, deforming and displaying the at least one first icon as an icon in a fluid type having viscosity so that the first icon is expanded within a designated scope according to the duration.

The displaying may further include, when an outline of the first icon reaches a threshold value in the designated scope, sequentially displaying at least one second icon around the first icon according to the duration.

The displaying may further include selecting one of the at least one second icon by the user, coupling and displaying the first icon with the selected second icon, and when there are a plurality of the at least one second icons, disappearing second icons not selected from among the plurality of second icons.

The displaying may further include, when the duration is equal to or greater than a predetermined first threshold value and the moving distance is equal to or greater than a predetermined second threshold value, displaying a UI to edit a menu item corresponding to the first icon around a first icon where the user command is input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
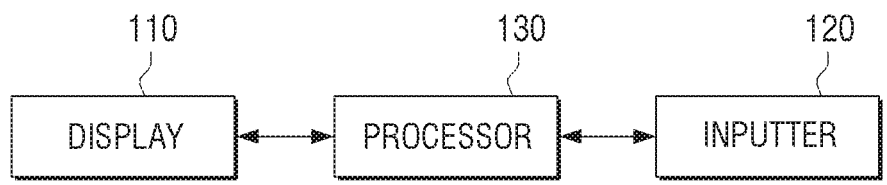
FIG. 1 illustrates various units of an electronic device for providing flexibility in an action confirmation using a fluid user interface (UI) element according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout the description, the terms user interface (UI) element and fluid UI element are used interchangeably.

Throughout the description, the terms action item and options are used interchangeably.

Throughout the description, the terms predefined duration threshold and duration threshold are used interchangeably.

Throughout the description, the terms predefined extent threshold and extent threshold are used interchangeably.

Various embodiments herein achieve a method implemented in an electronic device. The method includes receiving a user input on a fluid UI element. Further, the method includes estimating duration of an interaction with the fluid UI element and an extent of the interaction with the fluid UI element. Further, the method includes causing a deformation in the fluid UI element.

In an embodiment of the present disclosure, the deformation in the UI element represents a simulated viscosity of a virtual fluid.

In an embodiment of the present disclosure, the deformation in the UI element is caused in accordance to estimated duration and the extent of interaction with the fluid UI element by determining that the estimated duration reaches a predefined duration threshold and determining that the estimated extent reaches a predefined extent threshold.

In an embodiment of the present disclosure, causing the deformation in the fluid UI element based on the determination includes presenting plurality of action items sequentially at predefined intervals in response to determining that the estimated duration reaches the predefined duration threshold and the estimated extent does not reach the predefined extent threshold.

In an embodiment of the present disclosure, causing deformation of the UI element includes splitting the UI element in response to the determining that the estimated duration does not reach the predefined duration threshold and the estimated extent reaches the predefined extent threshold.

In an embodiment of the present disclosure, the method includes receiving selection of an action item from the plurality of action items and causing the deformation of the UI element to bind with the selected item.

In an embodiment of the present disclosure, the plurality of action items are sequentially presented in accordance with received interaction on a displayed item.

In an embodiment of the present disclosure, the user extent corresponds to a pressure applied on the UI element.

In an embodiment of the present disclosure, the UI element is caused to deform proportionately in accordance to the applied pressure.

In an embodiment of the present disclosure, the method further includes restoring deformation of the UI element in absence of the user input on the UI element.

Various embodiments herein achieve a method implemented in an electronic device. The method includes detection initiation of a user input on a fluid UI element, estimating duration of an interaction with the fluid UI element and an extent of the interaction with the fluid UI element. Further, the method includes determining ambiguity in the user input in response to the estimated duration exceeding a predefined duration threshold and estimated extent of the interaction not exceeding a predefined extent threshold. Furthermore, the method includes causing deformation of the fluid UI element for the determined ambiguity.

Various embodiments herein achieve an electronic device. The electronic device is configured to receive a user input on a fluid UI element. Further, the electronic device is configured to estimate duration of an interaction with the fluid UI element and an extent of the interaction with the fluid UI element. The electronic device is further configured to cause a deformation in the fluid UI element.

Various embodiments herein provides an electronic device configured to detect initiation of a user input on a fluid UI element, estimate duration of an interaction with the fluid UI element and an extent of the interaction with the fluid UI element. Further, the electronic device is configured to determine ambiguity in the user input in response to the estimated duration exceeding a predefined duration threshold and estimated extent of the interaction not exceeding a predefined extent threshold. Furthermore, the electronic device is configured to cause deformation of the fluid UI element for the determined ambiguity.

Various embodiments herein provides a computer program product including a computer executable program code recorded on a computer readable non-transitory storage medium. The computer executable program code when executed causing the actions includes receiving a user input on a fluid UI element. The computer executable program code when executed causing the actions includes estimating duration of an interaction with the fluid UI element and an extent of the interaction with the fluid UI element. The computer executable program code when executed causing the actions includes causing a deformation in the fluid UI element.

Various embodiments herein provide a computer program product including a computer executable program code recorded on a computer readable non-transitory storage medium. The computer executable program code when executed causing the actions includes detecting initiation of a user input on a fluid user interface (UI) element, estimating duration of an interaction with the fluid UI element and an extent of the interaction with the fluid UI element. The computer executable program code when executed causing the actions includes determining ambiguity in the user input in response to the estimated duration exceeding a predefined duration threshold and estimated extent of the interaction not exceeding a predefined extent threshold. The computer executable program code when executed causing the actions includes causing deformation of the fluid UI element for the determined ambiguity.

Unlike the systems and the methods of the related art, the proposed method provides the following features:

A. Fluid viscosity based flexible interaction mechanism: The UI elements are assigned properties of fluid behavior. An action button is represented as a virtual fluid mass. A user's gesture (i.e., a tap, a press and hold, a swipe, a drag, and the like) deforms it in multiple ways like real fluid (i.e., spread, separate, smear, and the like). At a particular extent of deformation, the threshold is crossed and the fluid mass breaks, which indicates the action confirmation. Using the fluid property of viscosity to enable a flexible threshold based trigger mechanism is implemented. This results in improving the user experience.

B. Fluid UI enabling in-gesture options: While taking the action using the fluid UI element, the user is provided with options on the fly based on the pace of the gesture. The fluid UI elements offering plurality of goals on demand, during the gesture, is implemented.

C. Gesture pace sensitivity: Variation in pace of the gesture is mapped to the number of options invoked, in a continuous way. This continuity is enabled through fluidic behavior of the UI. This results in enhancing the user experience.

D. Automated context preview with main action: While interacting with the fluid UI element, the user is given the opportunity to view options and information. This automated context preview, which helps the user to understand situations and take appropriate action is implemented. This results in improving the user experience.

E. Fluid viscosity enabling differential resistance in interaction based on context: The UI element is rendered with different levels of viscosity in different situations, thus enabling context appropriate resistance to the user's gesture.

F. Quick refining of intent while swiping to trigger action: While swiping to the trigger action, the user can quickly improvise to choose a more appropriate variant for user specific goal. In an example, while dismissing a notification, the user can pick the option of setting a reminder for it.

G. Flexibility to combine follow-up action with main action: This solution simplifies achieving goal involving multiple separate actions and gestures into one single swipe action. In an example, the user can choose to play video by cueing it to the last paused point on timeline.

H. Controlling range of options by swipe speed: This solution provides the unique flexibility of controlling the number of related options desired, by manipulating the speed of the swipe gesture.

I. Intuitive threshold mechanism based on Fluid viscosity: The fluid behavior physics is known to the user from the real life, hence the manipulation is intuitive for the user. The slowing down of the gesture suggests lack of clear decision, at which point the additional options appear to suggest a variation in objective. Both of these functions are intuitively aligned to the user's behavior pattern.

J. Automated context preview with main action: The related/follow-up action affordances provide user the scope and context of the main intent. It is an automated information support that can help understand situations and influence decisions of the user.

Unlike the methods and the systems of the related art, the proposed method provides easy and intuitive way for the users to select multiple options to complete the operation, while interacting with the fluid UI element.

Unlike methods and systems of the related art, the proposed method improves upon the primary intent of the user when threshold duration is crossed and/or a threshold extent of deformation is reached. This provides multiple options (may include the primary intent) in order to select other options by the user. This overcome the problem in the methods where the user is left with only one option to either select the primary intent or not selecting the primary intent of the related art. In the proposed method, if there is a delay in selection of primary intent (default option), then plurality of other related intents will be displayed. By this, the user can select either the primary intent or one among the related intents being displayed.

Referring now to the drawings, and more particularly to FIGS. 1, 2, 3, 4, 5A, 5B, 5C, 6, 7, 8, 9A, 9B, 9B, 10, 11, 12, 13, 14, 15, and 16, where similar reference characters denote corresponding features consistently throughout the figures, there are shown preferred embodiments.

FIG. 1 illustrates various units of an electronic device for providing flexibility in an action confirmation using a fluid UI element according to an embodiment of the present disclosure.

Referring to FIG. 1, an electronic device 100 can be, for example but not limited to, a smartphone, a mobile phone, personal digital assistant (PDA), a digital picture frame, a tablet, a laptop, a smart watch, a smart glass, and the like.

The electronic device 100 includes a display 110, an inputter 120, and a processor 130. The electronic device 100 may further include additional elements other than the aforementioned elements and it not limited thereto.

The display 110 may include a touch screen displaying various UIs and content. The display 110 may include a flexible display panel. The display 110 may display at least one first icon and at least one second icon which is a sub icon corresponding to the first icon. In addition, the display 110 may display a graphic effect in a fluid shape with viscosity. In an embodiment of the present disclosure, an icon may indicate an area on a display selected by a user and/or one point. For example, when a user touches and selects a point and/or an area of an image displayed on the display 110, it may be understood that a point and/or an area is an icon. In addition, an icon may include an image type displaying an item indicating a specific UI (User Interface). Further, in an embodiment of the present disclosure, a sub icon may not have a hierarchy structure with an icon. For example, the first icon may be an icon indicating an incoming call, and at least one sub icon which is a second icon may indicate a message or a speaker. Further, in an embodiment of the present disclosure, an icon, a sub icon, an item, an action item, a fluid UI element, and an UI element may be used interchangeably.

The inputter 120 may receive a user input to select an icon displayed on a display. In addition, the inputter 120 may receive a user command to move an icon selected by a user to a different area of the display 110.

For example, the inputter 120 may receive a user command by touching the display 110 through an input device, such as a user and/or a stylus pen. In addition, the inputter 120 may receive a user command of icons selected by a user through user gestures, such as a drag, a swap, a tap, a pinch, a press and hold, and the like. In addition, the inputter 120 may receive a user command through a voice command of a user. The above examples are not limited thereto, and the inputter 120 may receive a user command through various methods.

The processor 130, based on a user command regarding at least one icon received through the inputter 120, may determine duration to receive a user command and a moving distance of a user command. The processor 130, based on the determined duration of user command input and user command moving distance, may control the display 110 to display to display at least one second icon located around at least one first icon selected by a user on the display 110.

In addition, the processor 130, based on determined duration and moving distance, may control the display 110 to deform and display the first icon to which a user command is input as a fluid having viscosity.

The processor 130, when duration of a user command is greater than or equal to a predetermined duration, and a moving distance of a user command is less than a predefined moving distance, may control the display 110 to deform and display the first icon of which shape which is connected from a starting area of the first icon to a last area where a user command is input to a fluid having a shape of viscosity.

For example, a user may select at least one icon displayed on the display 110 by touch input, such as 'Tap' or 'Press and Hold'. At this time, duration of 'tap' of a user inputted on an icon or duration of 'press and hold' may be for 0.6 ms which is greater than or equal to a predetermined time (for example, 0.5 ms). In addition, a user may move at least one icon selected by the display 110 using a method of 'Drag' or 'Swipe'. At this time, a moving distance of a user command ('Drag' or 'Swipe') may be 1.99 cm which is less than a predefined moving distance (for example, 2 cm). At this time, the processor 130 may provide to the display 110 a graphic effect that an icon from a starting area to a last area where a user command is input has a fluid shape which is sagging, such as rubber. The aforementioned embodiments are not limited thereto.

The processor 130 may control the display 110 so as to sequentially display a second icon which is a plurality of sub icons corresponding to the first icon around the first icon in a fluid shape according to a user command duration.

For example, a user command maintenance time is greater than or equal to a prestored first duration, the processor 130 may control the display 110 to sequentially display the second icon in regular time interval. An order and/or shape of the second icon displayed on the display 110 may be embodied diversely.

The processor 130, when one of the at least one of second icons is selected by a user, may control the display 110 so that the first icon deformed to fluid can be bound to the selected second icon. In addition, at least one second icon is plural, the processor 130 may control the display 110 so that remaining second icons disappear from among the icons not selected. At this time, an order and shape that not selected other second icons disappear from the display 110 can be embodied diversely. In addition, when the first icon which is transformed in a fluid shape is completely bound with the selected second icon, the processor 130 may control the display 110 so that a UI which combines the first and the second icons can disappear.

When a gesture, such as swiping is entered in a direction from among the at least one second icon, the processor 130 may determine that a second icon which is closest to the first icon is selected by a user.

In addition, when a first icon is completely bound with an icon in a deformed fluid type and a selected second icon, the processor 130 may control the display 110 so that a UI corresponding to the selected second icon is displayed on a screen.

For example, an icon to select at least one icons displayed on a display may be an icon indicating an incoming call. When a user selects an Incoming Call and swipes to a right direction for more than a prestored time, sub icons indicating functions, such as a message and speaker phone corresponding to an Incoming Call can be displayed. When the selected sub icon indicates a speaker phone, an incoming call icon in a fluid type having viscosity can be bound to sub icons indicating a speaker phone. When the incoming call in a fluid type is completely bound with a sub icon indicating a speaker phone, it may disappear from a screen and a UI corresponding to a speaker phone can be provided on a screen.

When there are a plurality of second icons, and the first icon deformed to a fluid by a user approaches to one of the plurality of second icons, the processor 130 may control the display 110 so that a shape of the second icon near the first icon is displayed differently from a shape of the remaining second icons. For example, the first icon deformed to a sagging shape, such as rubber can approach to near four second icons by user commands (i.e., up/down/left/right swiping). At this time, a shape of the second icon closest to the first icon, from among four second icons can be different from a shape of remaining 3 icons, and a shape can be embodied diversely.

The processor 130 may control the display 110 to determine pressure to be input to a first icon by a user command, and deform the first icon to an icon in a fluid shape with viscosity based on duration to receive a user command and determined pressure.

The processor 130, when duration to receive a user command is greater than predetermined duration and determined pressure value is greater than predefined pressure value, may control the display 110 to deform the first icon to fluid type icon having viscosity so that the first icon is expanded within a predefined scope according to duration.

The processor 130, when a shape of the first icon reaches a threshold edge, may control the display 110 to sequentially display at least one second icon located around a fluid type icon according to duration to receive a user command.

The processor 130, when one of the at least one second icons is selected by a user, may bind to second icon with the first icon deformed in a fluid type.

The processor 130, when duration to receive a user command is greater than predefined first threshold value, when a moving distance of a user command is greater than a second threshold value, control the display 110 to display UI to edit a menu item corresponding to the first icon around the first icon where a user command is input.

The proposed method shows the fluid UI element which is assigned properties of the fluid behavior. The action confirmation is represented as the virtual fluid mass. The user's gesture (e.g., a tap, a press, a swipe, and the like) deforms it in multiple ways like real fluid (e.g., spread, separate, smear, and the like). At a particular extent of the deformation the threshold is crossed and the fluid mass breaks, this indicates the action confirmation. Using the fluid property of the viscosity to enable a flexible threshold based trigger mechanism is implemented.

The inputter 120 is configured to receive a user input on a fluid UI element. After receiving the user input on the fluid UI element, the processor 130 is configured to estimate duration of an interaction with the fluid UI element. The processor 130 is configured to estimate the extent level of the interaction with the fluid UI element. Based on the estimation, the processor 130 is configured to cause the deformation in the fluid UI element.

In an embodiment of the present disclosure, the deformation in the fluid UI element represents a simulated viscosity of a virtual fluid.

In an embodiment of the present disclosure, the deformation in the fluid UI element is caused in accordance to the estimated duration and the extent level of the interaction with the fluid UI element by determining that the estimated duration reaches a predefined duration threshold and determining that the estimated extent reaches a predefined extent threshold.

Figure 2:
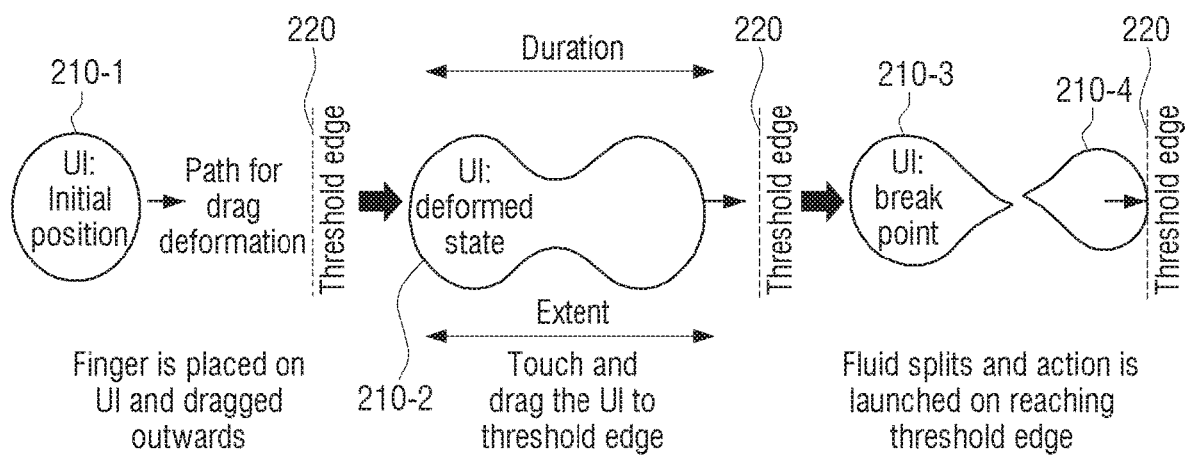
FIGS. 2 and 3 illustrate operating mechanisms of a fluid UI element according to various embodiments of the present disclosure.
Figure 3:
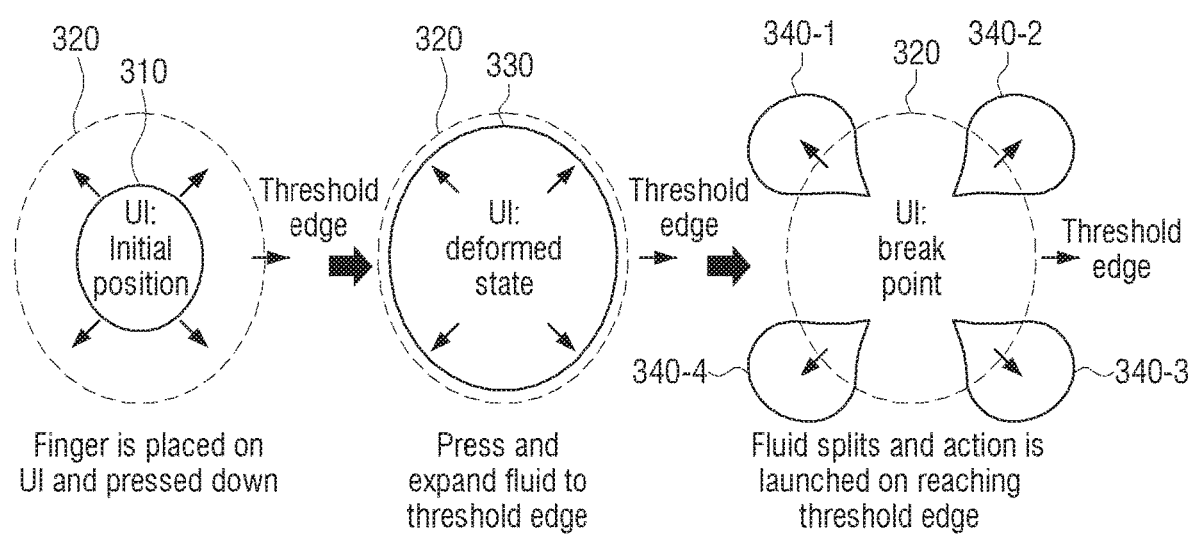

FIGS. 2 and 3 illustrate operating mechanisms of a fluid UI element according to various embodiments of the present disclosure.

FIG. 2 is a view illustrating the graphic effect where an icon is deformed to a fluid shape having viscosity according to a moving distance of a user command.

Referring to FIG. 2, in an example, the user finger is placed on a fluid UI element (210-1) and drags a fluid UI element (210-2) towards to a threshold edge (220). When the dragged fluid UI element (210-2) reaches the threshold edge (220), a dragged fluid UI element splits (210-3, 210-4) and one or more action items (not illustrated) are launched.

FIG. 3 is a view illustrating a graphic effect that an icon is deformed to a fluid shape having viscosity according to duration of a user command input.

Referring to FIG. 3, in another example, the user finger is placed on a fluid UI element 310 and pressed inwards. The fluid UI element 310 is expanded towards a threshold edge 320. When an expanded UI element 330 reaches to the threshold edge 320, the expanded UI element 330 splits (as shown in the FIG. 3) 340-1, 340-2, 340-3, 340-4 and one or more action items (not illustrated) are launched.

In an embodiment of the present disclosure, one or more action items are populated based on the user interaction (i.e., if the user of the electronic device 100 performs the gesture on the fluid UI quickly, the options populated on the fluid UI element are minimum, and if the user of the electronic device 100 performs the gesture on the fluid UI slowly, the options populated on the fluid UI element are maximum).

In an embodiment of the present disclosure, a rate or level of the deformation of the fluid UI element is based on a force applied against the fluid UI element, such as drag gesture in the fluid UI element or applying pressure on the fluid UI element.

In an embodiment of the present disclosure, a rate or level of the deformation of the fluid UI may be varied based on predefined settings.

In an embodiment of the present disclosure, causing the deformation in the fluid UI element based on the determination includes presenting plurality of action items sequentially in response to determining that the estimated duration reaches the predefined duration threshold and the estimated extent of the interaction with the fluid UI element reaches the predefined extent threshold.

In an embodiment of the present disclosure, causing deformation of the UI element includes splitting the UI element in response to the determining that the estimated duration reaches the predefined duration threshold and the estimated extent reaches the predefined extent threshold.

Further, the inputter 120 is configured to receive the selection of the action item from the plurality of action items and cause the deformation of the UI element to bind with the selected item. In an embodiment of the present disclosure, the plurality of action items is sequentially presented in accordance with received interaction on a displayed item. In an example, the plurality of action items are presented sequentially when the interaction is extended beyond the threshold duration predefined to the system.

Figure 4:
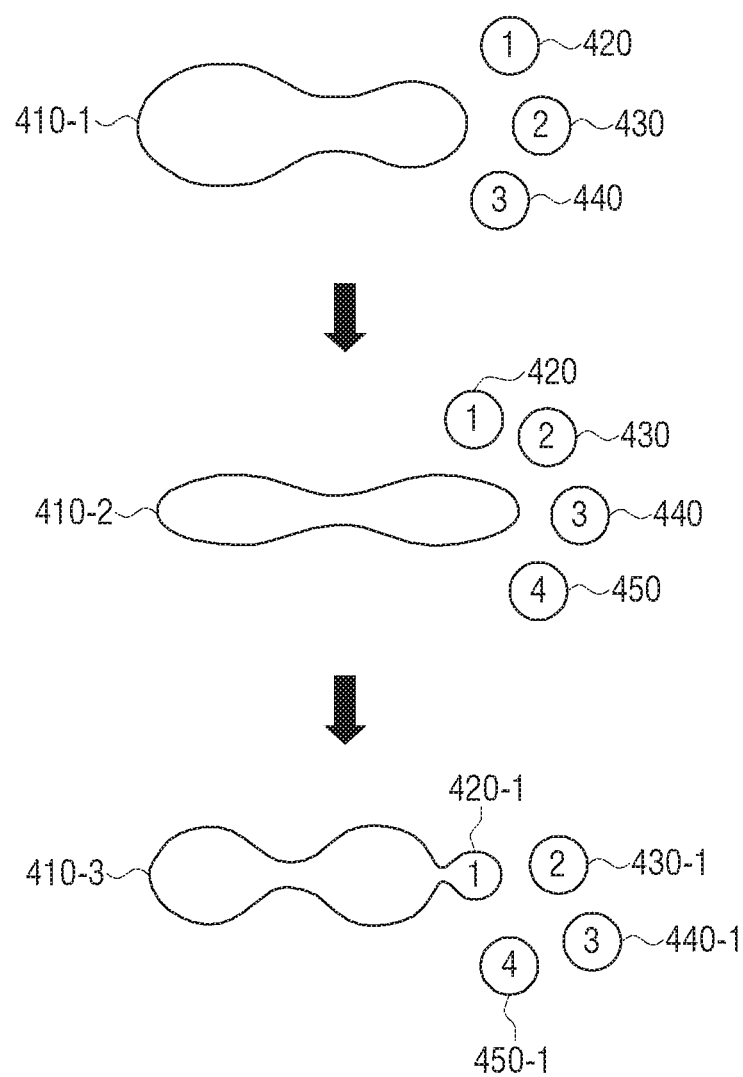
FIG. 4 illustrates a fluid UI element in which a deformed fluid UI element binds with a selected action item according to an embodiment of the present disclosure.

FIG. 4 illustrates a fluid UI element in which a deformed fluid UI element binds with a selected action item according to an embodiment of the present disclosure.

Referring to FIG. 4, when user input duration with respect to icons 410-1, 410-2, and 410-3 in a fluid type having viscosity is greater than prestored time, and a user command moving distance is greater than prestored moving distance, a plurality of sub icons 420, 430, 440, and 450 corresponding to icons 410-1 and 410-2 can be displayed according to duration of a user input. For example, when the sub icons 420, 430, 440, and 450 may be sequentially displayed with preset time interval in presorted time.

In addition, when a user drags and moves fluid type icon 410-1 to each of a plurality of sub icons 420, 430, 440, and 450, shape of sub icons 420, 430, 440, and 450 adjacent to icon 410-1 can be different from a shape of other sub icons.

For example, a user may swipe icon 410-1 in an upper direction to approach sub icon 420. At this time, a shape of a sub icon 420 nearby the icon 410-1 can be different from other sub icons 430, 440, and 450. For example, size of the sub icon 420 may be greater than other sub icons 430, 440, and 450. Or, size of sub icon 420 cannot be deformed and size of other sub icons 430, 440, and 450 can be displayed smaller than sub icon 420. The aforementioned embodiment is not limited thereto.

In another example, the UI element 410-3 is divided in response to the determining that the estimated duration reaches the predefined duration threshold and the estimated extent reaches the predefined extent threshold. The electronic device 100 receives the selection of the action item 420-1 from the plurality of action items 420-1, 430-1, 440-1, and 440-5 and bind with the selected item 420-1 as shown in the FIG. 4.

For example, a user may select one sub icon 420-1 from among a plurality of sub icons 420-1, 430-1, 440-1, and 440-5. When a user inputs a user command, such as swiping and dragging in a direction of sub icon 420-1 the icon 410-3 in a fluid type in more than a prestored distance (threshold edge), the electronic device 100 may determine that sub icon 420-1 is selected by a user. At this time, the electronic device 100 may provide graphic effect to bind the fluid type icon 410-3 with selected sub icon 420-1, and make not selected other sub icons 430-1, 440-1, and 450-1 disappear. In addition, the electronic device 100 may provide a graphic effect to change a screen to an operation screen corresponding to the selected sub icon 420-1.

In an example, if the user of the electronic device 100 rejects a call, the related follow-up actions (action items) 420, 430, 440, and 450 appear when the user reduces the swipe speed. The possible options for rejecting call are "Reject with message" 420, "Reject with automated answer" 430 and "Reject with call back reminder" 440 appears in the screen in accordance with the swipe speed. If the user selects the "Reject with message" 420-1, the deformed UI element 410-3 binds with the "Reject with message" 420-1.

In an example, when the user desires to send the message to another user and getting confused (ambiguity), the user stretches the fluid UI element slowly. This gesture provides the multiple options (or action items) for messaging as shown in the FIG. 7.

In an embodiment of the present disclosure, the extent of the fluid UI element corresponds to a pressure applied on the fluid UI element.

In an embodiment of the present disclosure, the fluid UI element is caused to deform proportionately in accordance to the applied pressure.

In an embodiment of the present disclosure, the fluid UI element is deformed based on the drag distance (i.e., measures the drag distance from start position and deforms the fluid UI element proportionately).

In an embodiment of the present disclosure, the fluid UI element is deformed based on the drag distance and the applied pressure.

Further, the deformation management unit is configured to restore the deformation of the fluid UI element in absence of the user input on the fluid UI element.

In an embodiment of the present disclosure, the fluid UI element in the proposed method represents an object. For example, the object can be a flower with petals. When the extent of interaction with a petal towards the displayed option crosses the extent threshold, then the petal is associated with the selected option.

In an embodiment of the present disclosure, the deformation of the fluid UI element may simulate a physical interaction on the UI. In an embodiment of the present disclosure, the simulation may include a direct mapping between the deformation of the fluid UI element and the simulated interaction. In an embodiment of the present disclosure, the simulation may include a representative mapping between the deformation of the fluid UI element and the simulated interaction.

In an embodiment of the present disclosure, the deformation of the fluid UI element may simulate an interaction with the fluid UI element that indicates the movement of the virtual fluid.

In an embodiment of the present disclosure, the fluid UI element may be able to deform to a plurality of different positions. The fluid UI element may be operable to deform along one or more degrees of motion, such as in an outward direction, an inward direction, twisting motion, and stretching motion, or any combination thereof.

In an embodiment of the present disclosure, the fluid UI element may be operable to deform in a free-form manner, such as in the deformation of a sponge-like material.

The processor 130 may cause a surface deformation with the selected action item.

In case of dual-display screens, the fluid UI element is coplanar with the display screen and is placed above, below, or part of the display screen. In an example, the fluid UI element is placed on a back side of the electronic device 100.

Figure 5A:
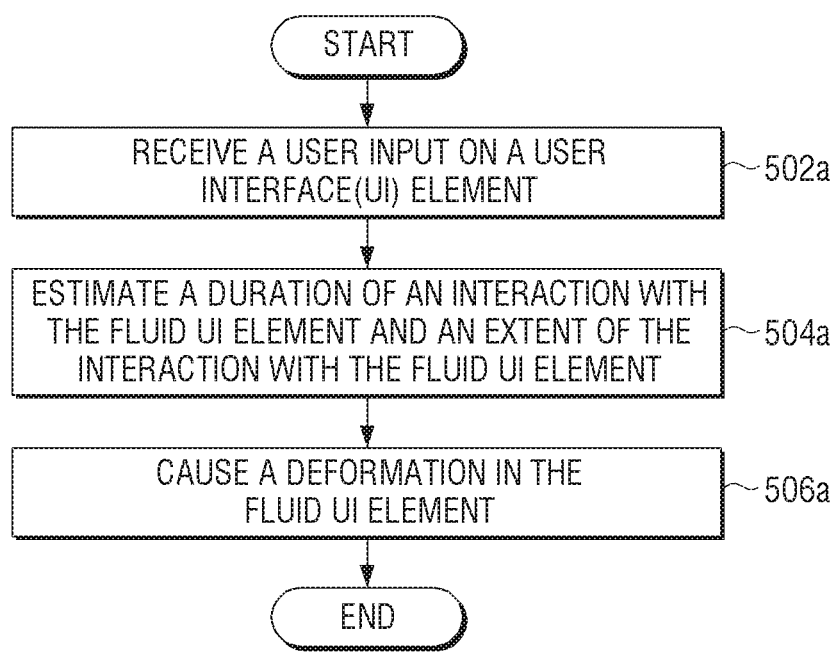
FIG. 5A is a flowchart illustrating a method for causing a deformation in a fluid UI element according to an embodiment of the present disclosure.

FIG. 5A is a flowchart illustrating a method for causing the deformation in the UI element according to an embodiment of the present disclosure.

Referring to FIG. 5A, at operation 502a, the method includes receiving the user input on the UI element. In an embodiment of the present disclosure, the method allows the input recognition unit to receive the user input on the UI element. At operation 504a, the method includes estimating the duration of the interaction with the fluid UI element and the extent of the interaction with the fluid UI element. In an embodiment of the present disclosure, the method allows the processor 130 to estimate the duration of the interaction with the fluid UI element and the extent of the interaction with the fluid UI element. At operation 506a, the method includes causing the deformation in the UI element. In an embodiment of the present disclosure, the method allows the processor 130 to cause the deformation in the UI element.

The proposed method provides flexibility using the fluid viscosity based UI element. This flexibility can be in two ways.

Multiplicity of functions based on duration of the trigger action: The UI element needs to be deformed to the threshold point to trigger action. Increase in duration to deform the fluid based trigger progressively substantiates the original intent with related information or action items. This is because the delay is mapped to user's need for more contextual content or refinement around the primary intent.

Context related change in viscosity of the fluid UI element: The second way of flexibility is when the interface changes the viscosity of the fluidic UI element depending on the specific context so that executing the same action can have varying difficulty levels (i.e., pressure, duration, time, and the like).

The various actions, acts, blocks, operations, and the like, in the method may be performed in the order presented, in a different order or simultaneously. Further, in some embodiments of the present disclosure, some of the actions, acts, blocks, operations, and the like, may be omitted, added, modified, skipped, and the like, without departing from the scope of the present disclosure.

Figure 5B:
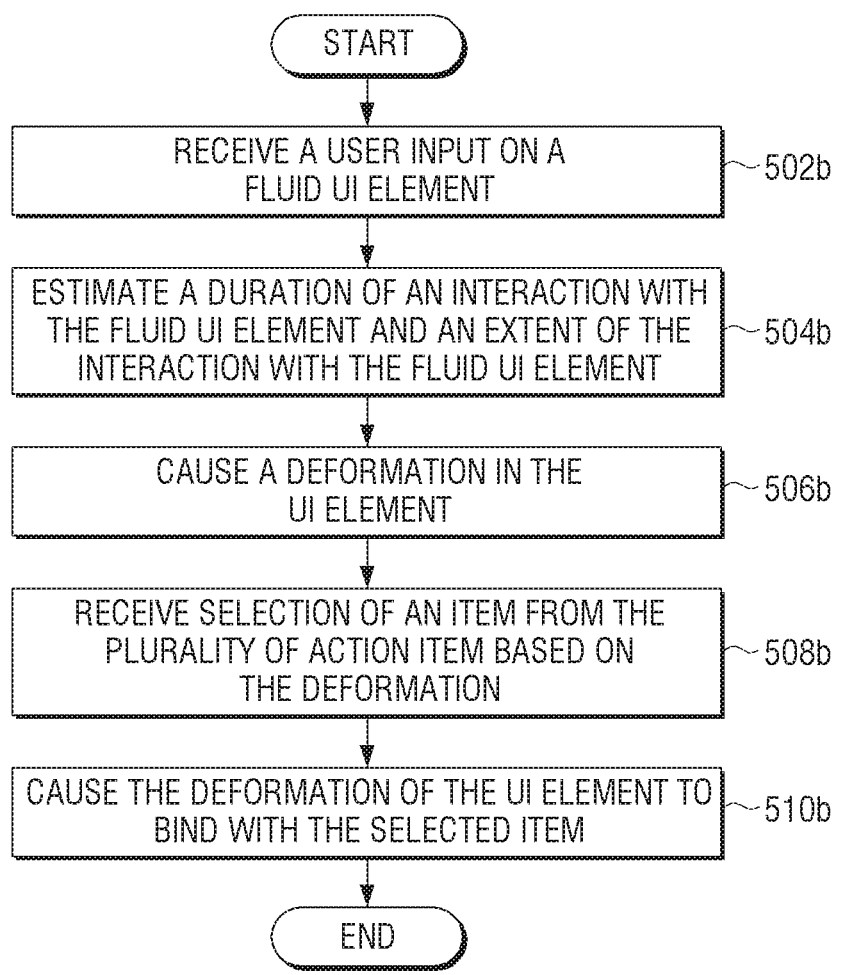
FIG. 5B is a flowchart illustrating a method for binding a deformed fluid UI element with a selected action item according to an embodiment of the present disclosure.

FIG. 5B is a flowchart illustrating a method for binding a deformed fluid UI element with a selected item according to an embodiment of the present disclosure.

Referring to FIG. 5B, at operation 502b, the method includes receiving the user input on the fluid UI element. In an embodiment of the present disclosure, the method allows the inputter 120 to receive the user input on the UI element. At operation 504b, the method includes estimating the duration of the interaction with the fluid UI element and the extent of the interaction with the fluid UI element. In an embodiment of the present disclosure, the method allows the processor 130 to estimate the duration of the interaction with the fluid UI element and the extent of the interaction with the fluid UI element. At operation 506*b*, the method includes causing the deformation in the UI element. In an embodiment of the present disclosure, the method allows the processor to cause the deformation in the UI element.

At operation 508*b*, the method includes receiving the selection of the action item from the plurality of action items based on the deformation. In an embodiment of the present disclosure, the method allows the inputter 120 to receive the selection of the action item from the plurality of action items based on the deformation. At operation 510*b*, the method includes causing the deformation of the UI element to bind with the selected item. In an embodiment of the present disclosure, the method allows the processor 130 to cause the deformation of the UI element to bind with the selected item.

The various actions, acts, blocks, operations, and the like, in the method may be performed in the order presented, in a different order or simultaneously. Further, in some embodiments of the present disclosure, some of the actions, acts, blocks, operations, and the like, may be omitted, added, modified, skipped, and the like, without departing from the scope of the present disclosure.

Figure 5C:
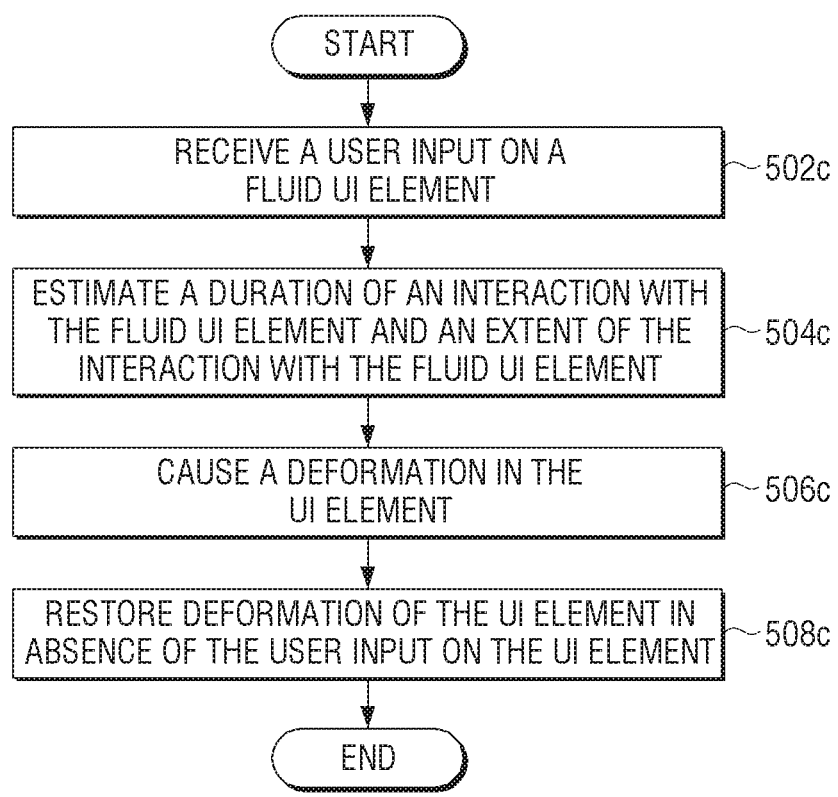
FIG. 5C is a flowchart illustrating a method for restoring deformation of a fluid UI element in absence of a user input on the fluid UI element according to an embodiment of the present disclosure.

FIG. 5C is a flowchart illustrating a method for restoring deformation of a fluid UI element in absence of a user input on a fluid UI element according to an embodiment of the present disclosure.

Referring to FIG. 5C, at operation 502*c*, the method includes receiving the user input on the UI element. In an embodiment of the present disclosure, the method allows the input unit to receive the user input on the UI element. At operation 504*c*, the method includes estimating the duration of the interaction with the fluid UI element and the extent of the interaction with the fluid UI element. In an embodiment of the present disclosure, the method allows the processor 130 to estimate the duration of the interaction with the fluid UI element and the extent of the interaction with the fluid UI element. At operation 506*c*, the method includes causing the deformation in the fluid UI element. In an embodiment of the present disclosure, the method allows the processor 130 to cause the deformation in the UI element. At operation 508*c*, the method includes restoring deformation of the UI element in absence of the user input on the fluid UI element. In an embodiment of the present disclosure, the method allows the processor 130 to restore the deformation of the fluid UI element in absence of the user input on the UI element. The absence of the user input can be, for example but not limited to, releasing of a dragging operation on the UI element, releasing of a pressing operation on the UI element, or combination of both.

The proposed method enhances the user convenience and increases the usability and competitiveness of the UI element.

The various actions, acts, blocks, operations, and the like, in the method may be performed in the order presented, in a different order or simultaneously. Further, in some embodiments of the present disclosure, some of the actions, acts, blocks, operations, and the like, may be omitted, added, modified, skipped, and the like, without departing from the scope of the present disclosure.

Figure 6:
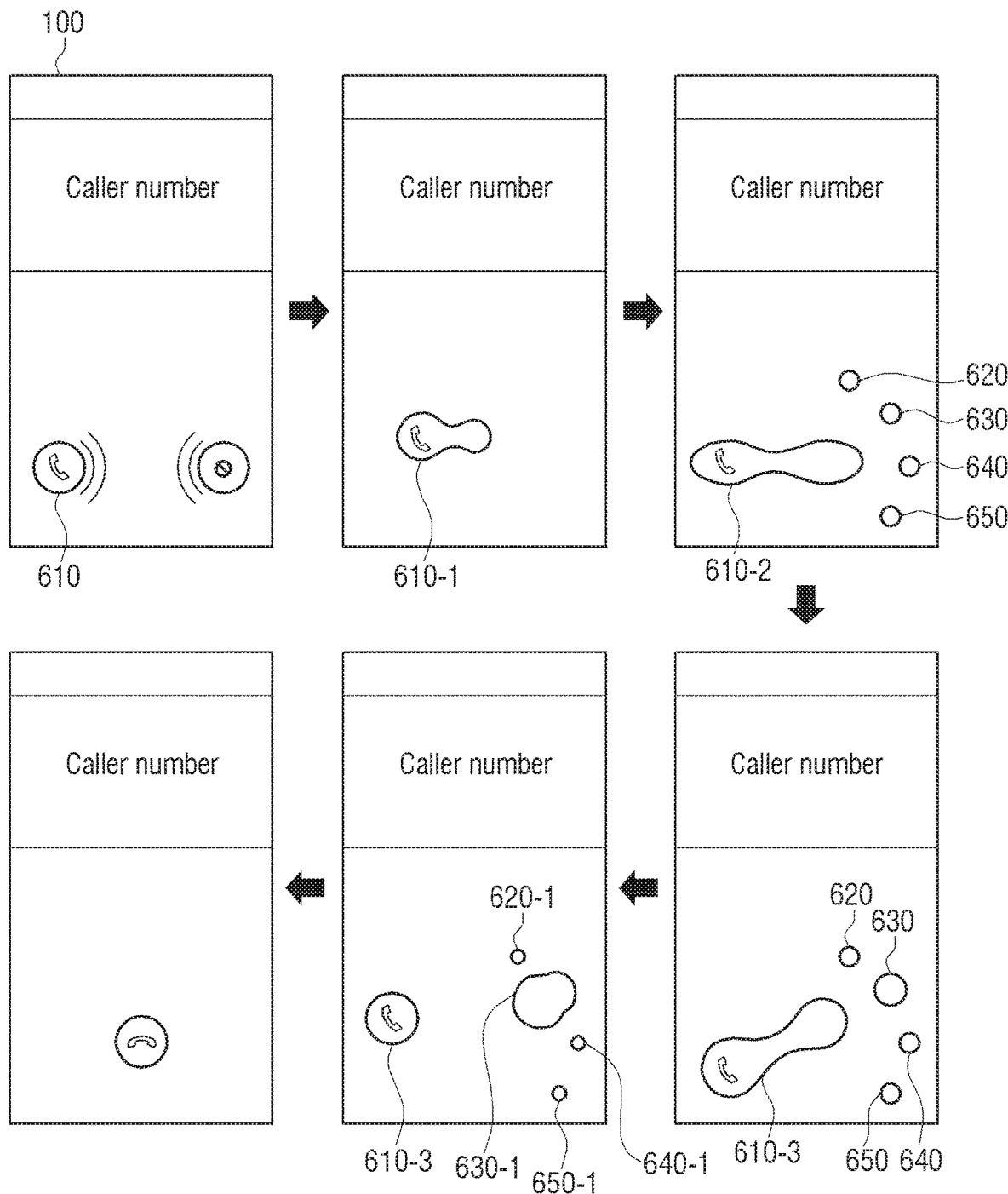
FIG. 6 illustrates an incoming call related options displayed in accordance to an interaction using a fluid UI element according to various embodiments of the present disclosure.

FIG. 6 illustrates an incoming call related options displayed in accordance to an interaction using a fluid UI element according to various embodiments of the present disclosure.

Referring to FIG. 6, when the user of the electronic device 100 receives a call from a caller, the user can attend the call directly by deforming the fluid UI element beyond the extent threshold and within the duration threshold. When the user has ambiguity in attending the call and desires additional options, then the user does not deform the fluid UI element till the extent threshold within the duration threshold.

For example, a user may select a call icon 610 and swipe in a right direction for more than duration of user command input. At this time, the call icon 610 may be deformed to an icon 610-1 in a fluid type having viscosity. When a user swipe the call icon 610-1 in a right direction for more than prestored moving distance and reach threshold edge of stored moving distance, the call icon 610-1 may be deformed to the icon 610-2 in a fluid type having viscosity as much as a moving distance.

Once the duration threshold is crossed, the options (i.e., action items) 620, 630, 640, and 650 related to the call 610 appear before the user. More options are sequentially presented on the fluid UI element as more time is spent on the interaction beyond the duration threshold of the interaction. The options are presented at predefined intervals as the user continues to spend more time on the interaction. If at any point of time, user disengages, then the deformation is restored. As shown in the FIG. 6, the action items 620, 630, 640, and 650 are speaker option 620, video call option 630, mirror screen option 640, and recording option 650. The options are sequentially presented in accordance with the deformation of the UI element. The predefined interval refers to the presentation of options sequentially following a predefined time in which the option (s) is/are presented. For example, the speaker option 620, video call option 630 is presented in 2 milliseconds and the mirror screen option 640 is presented in 2.5 milliseconds and recording option 650 is presented in 3 milliseconds. When the user desires to select the option, the user has to perform the action (i.e., attending the call along with the video call) on the UI. In response to the user selected item 630-1, the deformed UI element 610-3 binds with the user selected item 630-1 (i.e., a video call) and remaining items 620-1, 640-1, 650-1 not selected disappear gradually.

Figure 7:
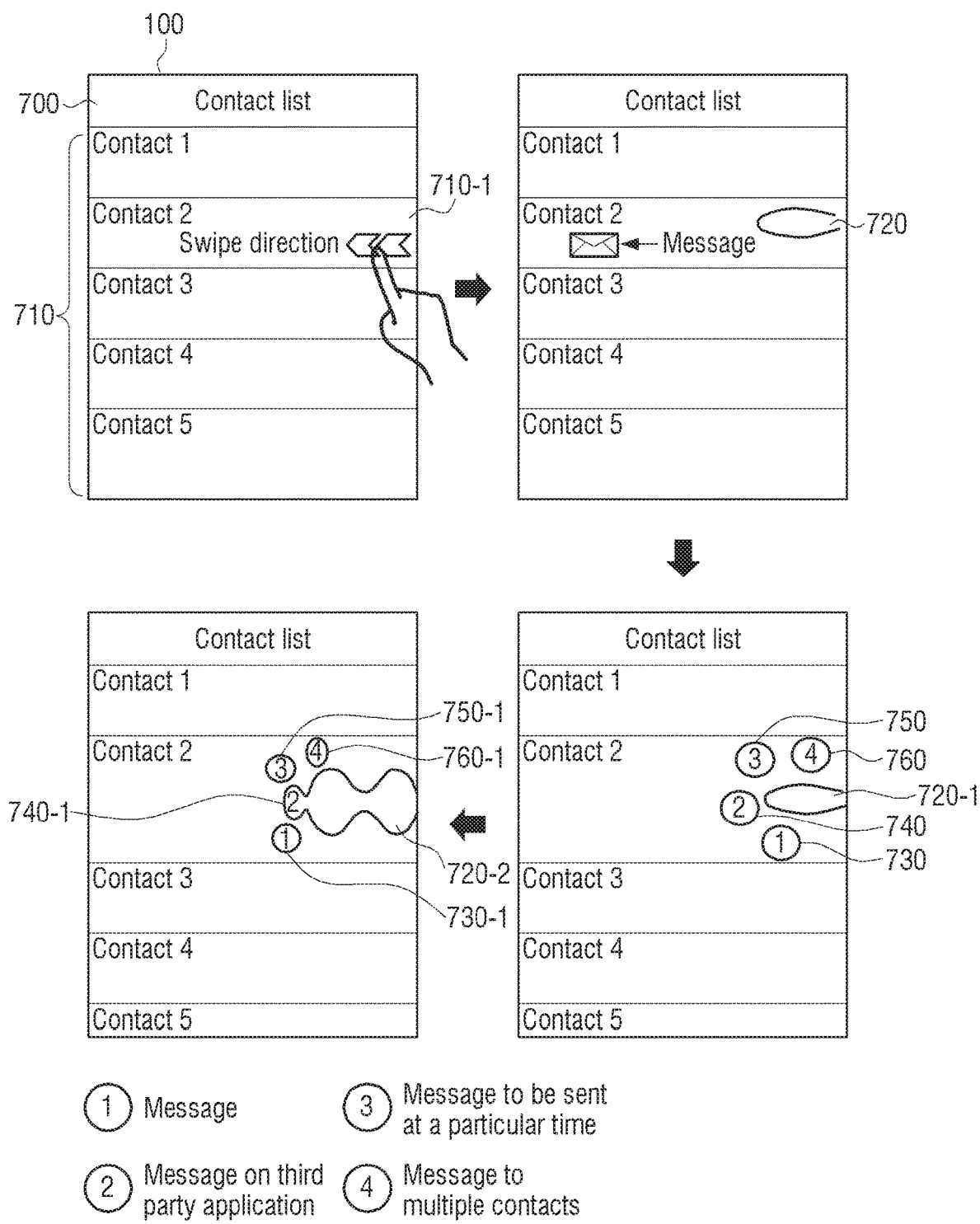
FIG. 7 illustrates messaging options displayed in accordance to a 'swipe to message' interaction using a fluid UI element in a contact application according to various embodiments of the present disclosure.

FIG. 7 illustrates messaging options displayed in accordance to a 'swipe to message' interaction using a fluid UI element in a contact application according to various embodiments of the present disclosure.

Referring to FIG. 7, when the user of the electronic device 100 desires to send the message to a contact 710-1 from a plurality of contacts 710 in a contact list 700 the user can send the message by deforming a fluid UI element 720 beyond the extent threshold. When the user has ambiguity in sending the message to the contact 710-1 and desires additional options, then the user does not deform the fluid UI element 720 till the extent threshold within the duration threshold. Once the duration threshold is crossed, the action items 730, 740, 750, and 760 (i.e., a message, a message on third party application, a message to be sent at a particular time, and a message to multiple contacts) correspond to the messaging application appears on the fluid UI element 720-1. The action items 730, 740, 750, and 760 are sequentially presented at predefined intervals on the fluid UI element 720-1 as more time is spent on the interaction beyond the duration threshold. If at any of time, user disengages, then the deformation is restored.

When the user desires to select the options, the user has to perform the action to select the specific action item 740 (i.e., a message on third party application). In response to the selected action item 740, the deformed UI element 720-2 binds with the selected item 740-1 (i.e., a message on third party application) and the message will be sent to the contact 2 through the third party application.

At this time, the electronic device 100 may provide a graphic effect to bind deformed UI element 720-2 to a selected action item 740-1, and not selected action items 730-1, 750-1, and 760-1 disappear. In addition, the electronic device 100 may provide a message transmission UI corresponding to the selected action item 740-1 (i.e., a message on third party application) on a screen.

Figure 8:
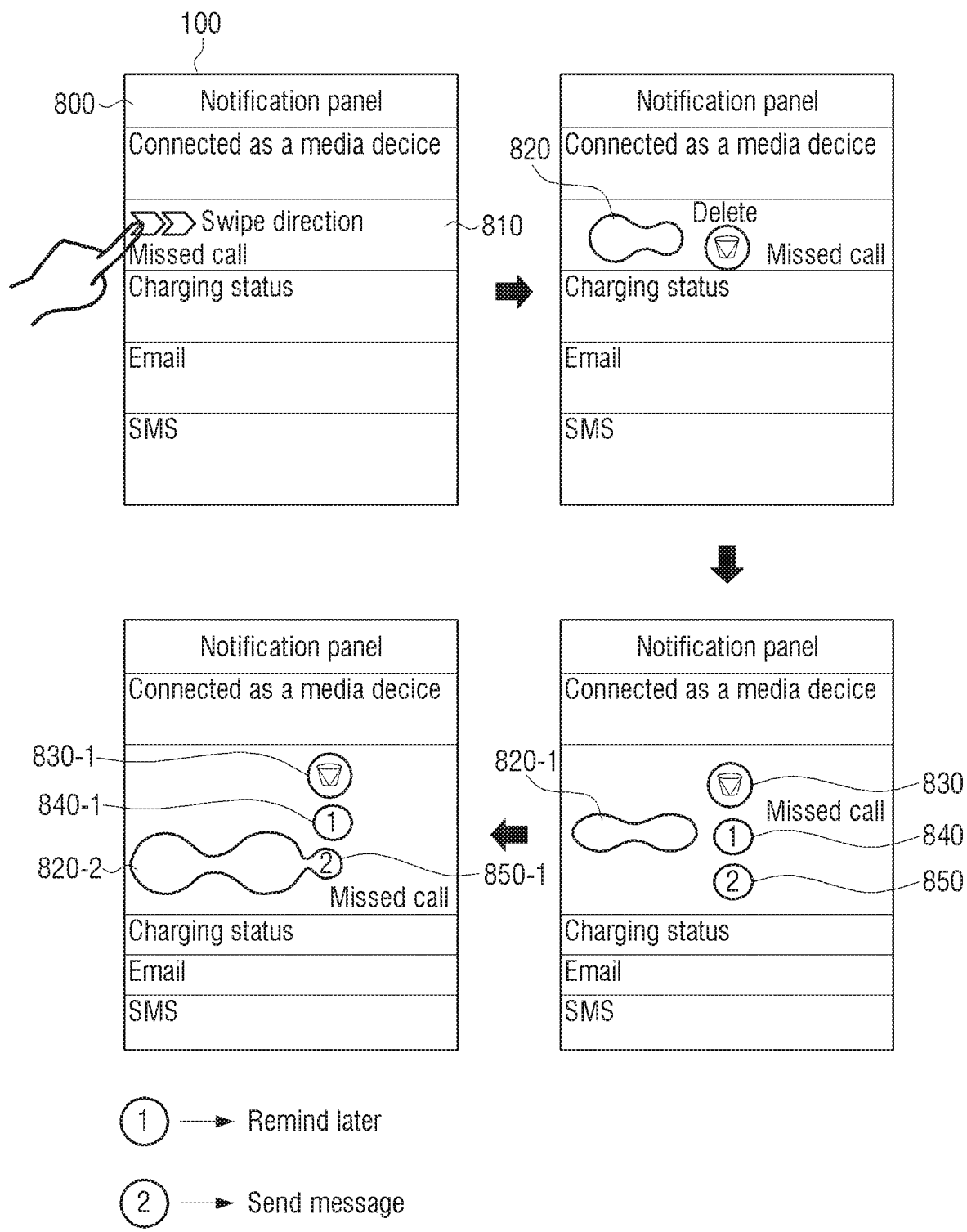
FIG. 8 illustrates options displayed in accordance to a 'swipe to delete' interaction using a fluid UI element in a notification panel according to various embodiments of the present disclosure.

FIG. 8 illustrates options displayed in accordance to a 'swipe to delete' interaction using a fluid UI element in a notification panel according to various embodiments of the present disclosure.

The user of the electronic device 100 tends to dismiss notifications and forget some of the important notifications to attend. The proposed method provides the suggested options to attend important notifications while dismissing in a notification panel 800. In an example, possible follow-up options for the missed call notification 810 are "Remind later", "Call back" or "Send message".

Referring to FIG. 8, when the user of the electronic device 100 desires to select the missed call in a notification panel 800 the user can directly delete the missed call by deforming a fluid UI element 820 beyond the extent threshold and within the duration threshold. When the user has ambiguity in deleting the missed call notification and desires additional options, then the user does not deform the fluid UI element till the extent threshold within the duration threshold. Once the duration threshold is crossed, options 830, 840, and 850 are presented on a fluid UI element 820-1. The more options are sequentially presented at predefined intervals on the UI as more time is spent on the interaction beyond the duration threshold of the interaction. If at any point of time, user disengages, then the deformation is restored. The user desires to perform the action associated with the option 850 (i.e., remind later) on the fluid UI element 820-1. Based on the user selection, a deformed UI element 820-2 binds with the selected item 850-1 (i.e., remind later). At this time, the electronic device 100 may provide a graphic effect that not selected items 830-1 and 840-1 disappear.

Figure 9A:
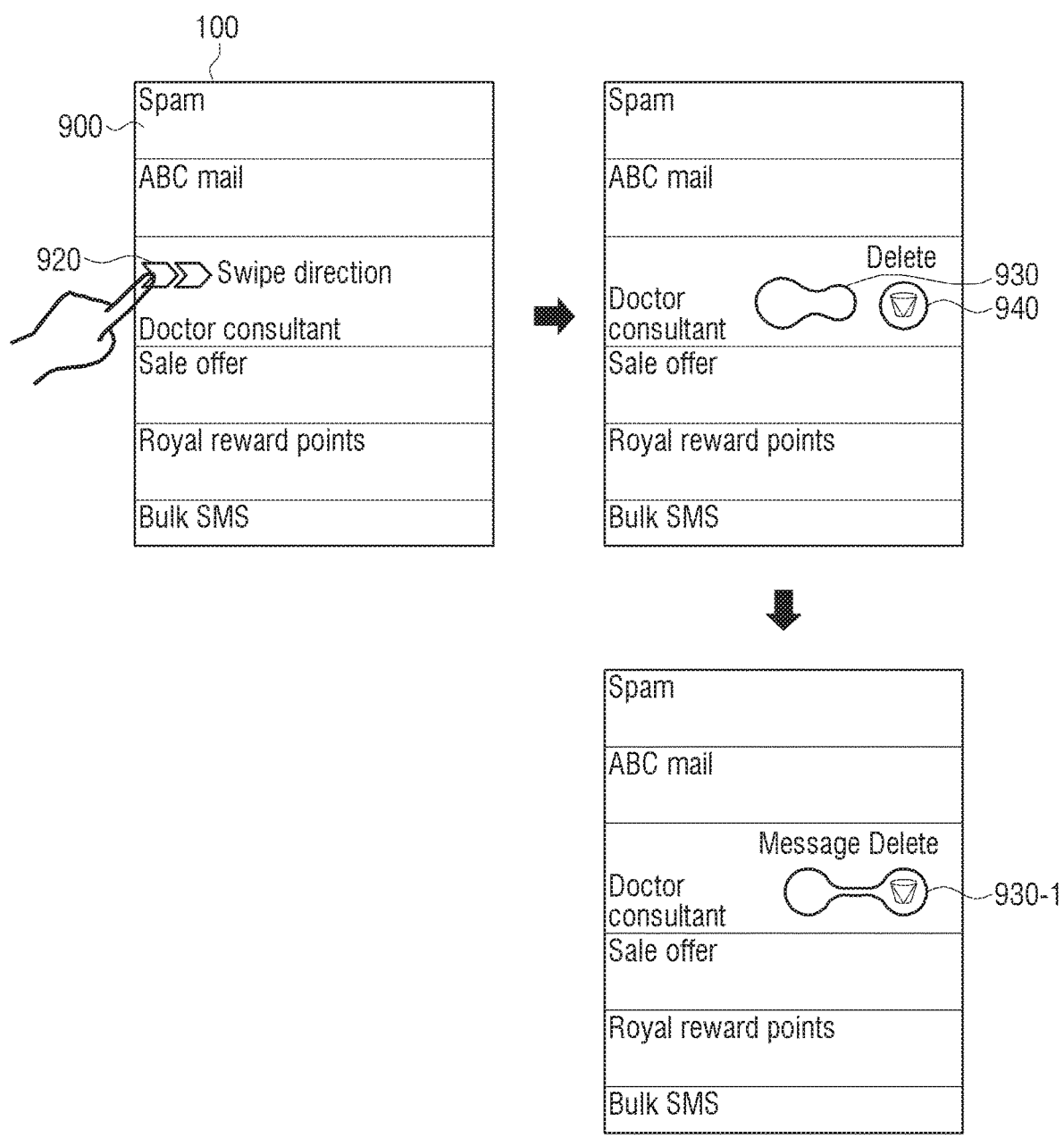
FIGS. 9A and 9B illustrate deleting functionality invoked in accordance to an interaction using a fluid UI element according to various embodiments of the present disclosure.
Figure 9B:
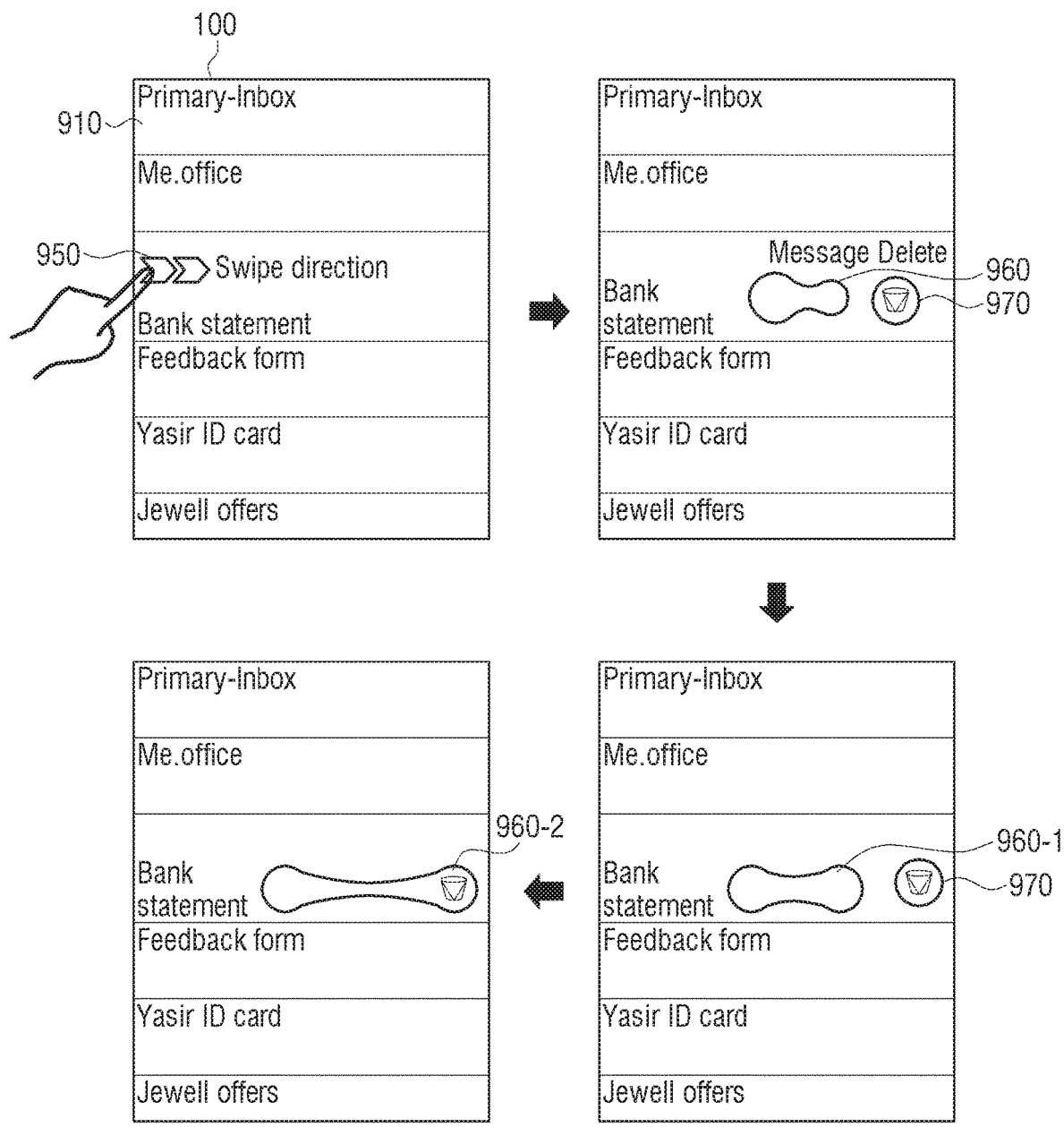

FIGS. 9A and 9B illustrate deleting functionality invoked in accordance to an interaction using a fluid UI element according to various embodiments as disclosed herein.

The electronic device 100, when a user input duration is greater than a first threshold value, and a user command moving distance is greater than predefined second threshold value, may provide a graphic effect to display UI for editing a menu item corresponding to an icon where a user command is input.

Referring to FIG. 9A, the electronic device 100 may receive a command to select one mail (for example, doctor consultant) to delete e-mail list in a folder 900 and swipe 920 in a right direction. At this time, the electronic device 100 may provide a fluid UI 930 corresponding to swiping 920 command and a deletion menu icon 940. When a command input duration of a user regarding the fluid UI 930 is less than prestored first threshold value (for example, 0.1 ms) and a user command moving distance reaches prestored second threshold value (for example, 1 cm), the electronic device 100 may automatically bind the fluid UI 930-1 with the deletion menu icon to delete a selected mail.

Referring to FIG. 9B, the electronic device 100 may receive a command to select one mail (for example, bank statement) to delete email list in primary folder 910 and swipe 950 in a right direction. At this time, the electronic device 100 may provide fluid UI 960 corresponding to the swipe command 950 and deletion menu icon 970. When user input duration and user command moving distance satisfy the first threshold value and the second threshold value described in FIG. 9A, the electronic device 100 may not automatically delete a selected mail. In contrast, when a user command input duration with respect to fluid UI 960-1 is greater than prestored third threshold value (for example, 0.5 ms) and user command moving distance reaches prestored fourth threshold value (for example, 2.5 cm), the electronic device 100 may provide fluid UI 960-2 where the fluid UI 960-1 is bound with deletion menu icon 970 and delete selected email.

For example, the electronic device 100 may set so that different operations are operated according to viscosity of fluid UI based on user input duration and user command moving distance. As described above, when it is necessary to rapidly perform a command for a selected item, such as a spam mail box, the electronic device 100 may set viscosity of the fluid UI to be low so that user command input duration is short and user command moving distance is short. In contrast, when it is necessary to perform command on the selected item, such as Primary Mail box than spam mail box, the electronic device 100 may set viscosity of fluid UI to be high so as to make user command duration be higher and user command moving distance be longer. The aforementioned threshold value is to describe the present disclosure and is not limited thereto. The threshold value can change diversely according to size and response speed of the electronic device.

The user of the electronic device 100 tends to delete a message in the email. The deformation threshold distance of the UI element in the folder 900 is less as compared to that of the primary folder 910. As a result, the user is able to execute operation easily as compared to that of the folder 900 (as shown in FIG. 9A), The viscosity of the virtual fluid is also more in case of the primary folder 910 which will require more time/pressure for the same delete operation as compared to the folder 900. Thus, the proposed method provides flexibility of ease of execution for similar operations with respect to the context in which the deformation is applied. The importance of the primary folder 910 is higher than that of the folder 900 and the UI provides greater resistance in case of the primary folder 910 to allow user more decision making time while deleting the more important email.

Figure 10:
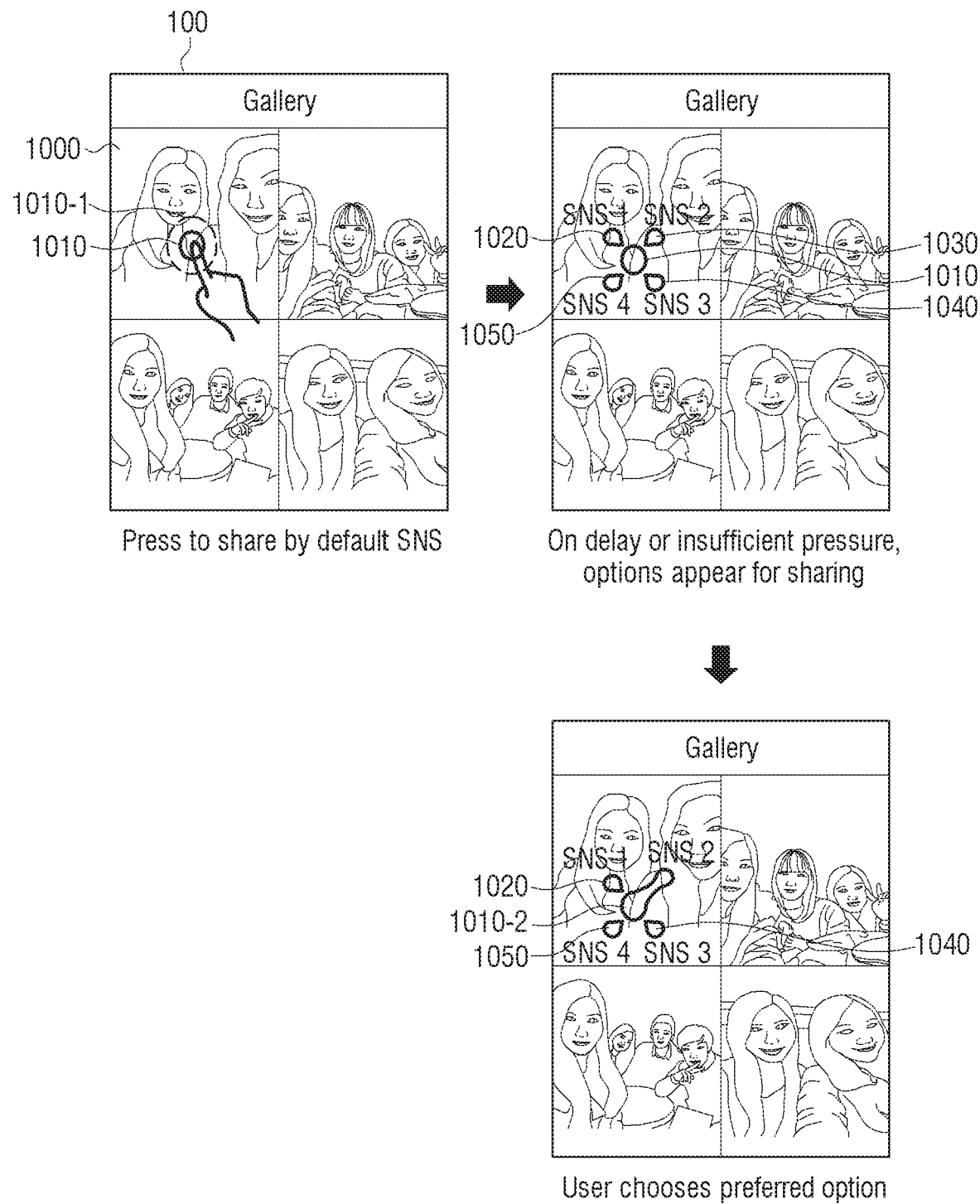
FIG. 10 illustrates various social networking services (SNS) displayed in accordance to an interaction using a fluid UI element in a gallery according to various embodiments of the present disclosure.

FIG. 10 illustrates social networking services (SNS) displayed for sharing an image in accordance to an interaction using a fluid UI element in a gallery according to various embodiments of the present disclosure.

Referring to FIG. 10, in gallery application, the user selects an image from a gallery 1000. When the user desires to send the image to another user using a default SNS, the user deforms the fluid UI element by applying pressure and crosses over the pressure (extent) threshold within a duration threshold 1010-1. However, if the user gets confused (ambiguity), the user does not cross over the pressure threshold within the duration threshold 1010-1. Once the duration threshold 1010-1 is crossed, more options 1020, 1030, 1040, and 1050 are presented on the fluid UI element. For example, a user may select one photo through touch or tap input in the gallery. At this time, the selected icon 1010 can be displayed at a point input by a user. The electronic device 100 may provide a graphic effect to expand icon 1010 according to time within a designated scope until input duration becomes a prestored time. The options 1020, 1030, 1040, and 1050 are sequentially presented at predefined regular intervals as the user continues to spend more time on the interaction. If at any point of time, user disengages, then the deformation is restored. The plurality of options 1020, 1030, 1040, and 1050 (i.e., sharing the selected picture on an SNS 1 to SNS 4) is presented on the fluid UI. Based on the user selected option 1030 (i.e., the user select to share the picture through the SNS 2), the deformed UI element 1010-2 binds with the selected option 1030 (i.e., the SNS 2). The selected image is shared to another electronic device through the SNS 2 1030.

Figure 11:
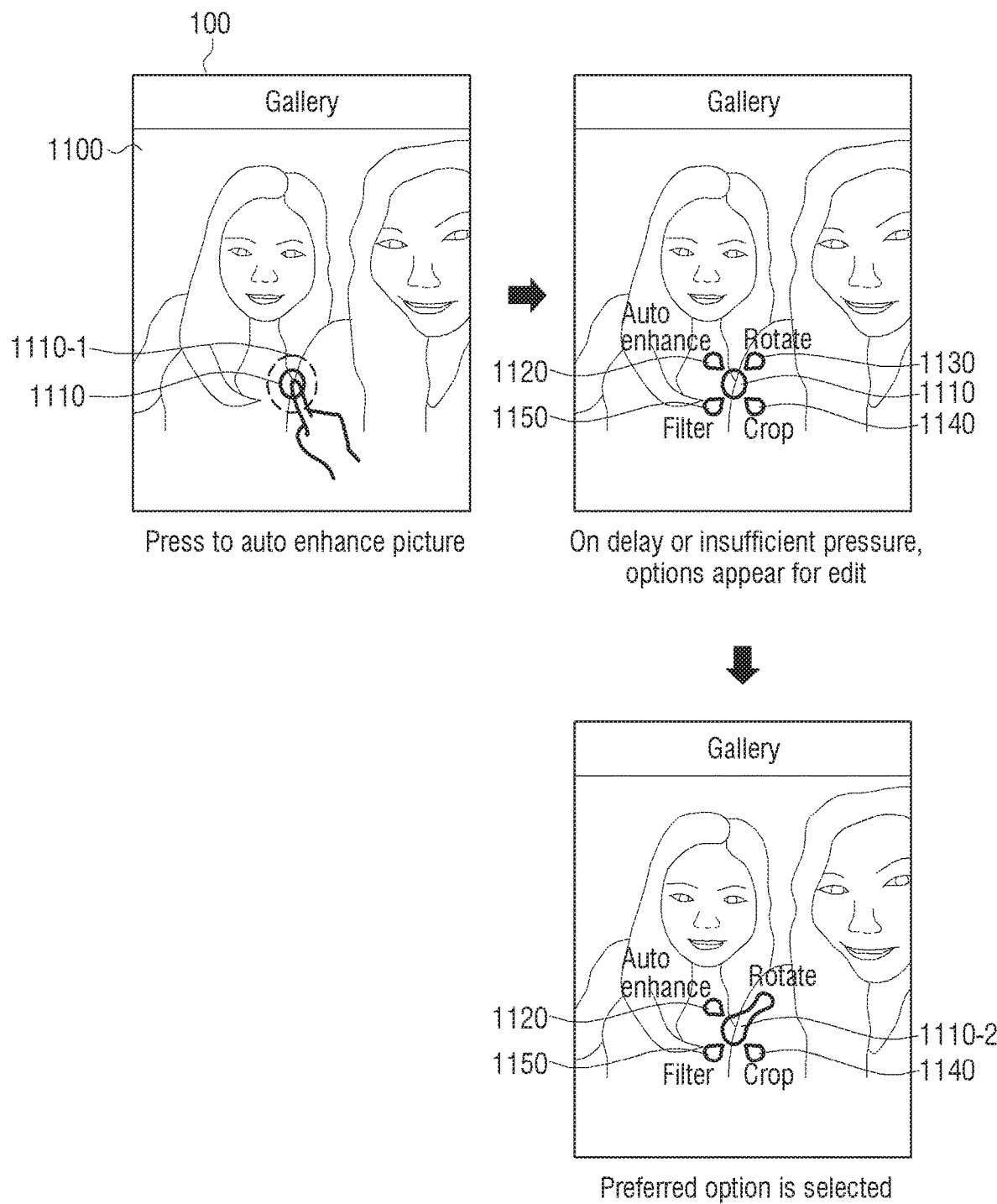
FIG. 11 illustrates options for editing displayed in accordance to an interaction using a fluid UI element in a gallery application according to various embodiments of the present disclosure.

FIG. 11 illustrates various options for editing displayed in accordance to an interaction using a fluid UI element in a gallery according to various embodiments of the present disclosure.

Referring to FIG. 11, a user selects an image 1100 from the gallery. When the user desires to edit the image 1100 by pressing an auto enhance option the user deforms a fluid UI element 1110 by applying pressure and crossed over the pressure (extent) threshold within a duration threshold 1110-1. However, if the user is getting confused (ambiguity) to edit the picture, the does not cross over the pressure threshold within the duration threshold 1110-1. Once the duration threshold is crossed, more options 1120, 1130, 1140, and 1150 are presented on the fluid UI element. The options 1120, 1130, 1140, and 1150 are presented at predefined intervals as the user continues to spend more time on the interaction. If at any point of time, user disengages, then the deformation is restored. In response, the options 1120, 1130, 1140, and 1150 (i.e., delete the picture, rotate the picture, crop the picture, and tool) are sequentially presented on the UI. Based on the user selected option 1130 (i.e., the user selects to rotate the picture), the deformed UI element 1110-2 binds with the selected option 1130. The selected picture is rotated in the gallery.

Figure 12:
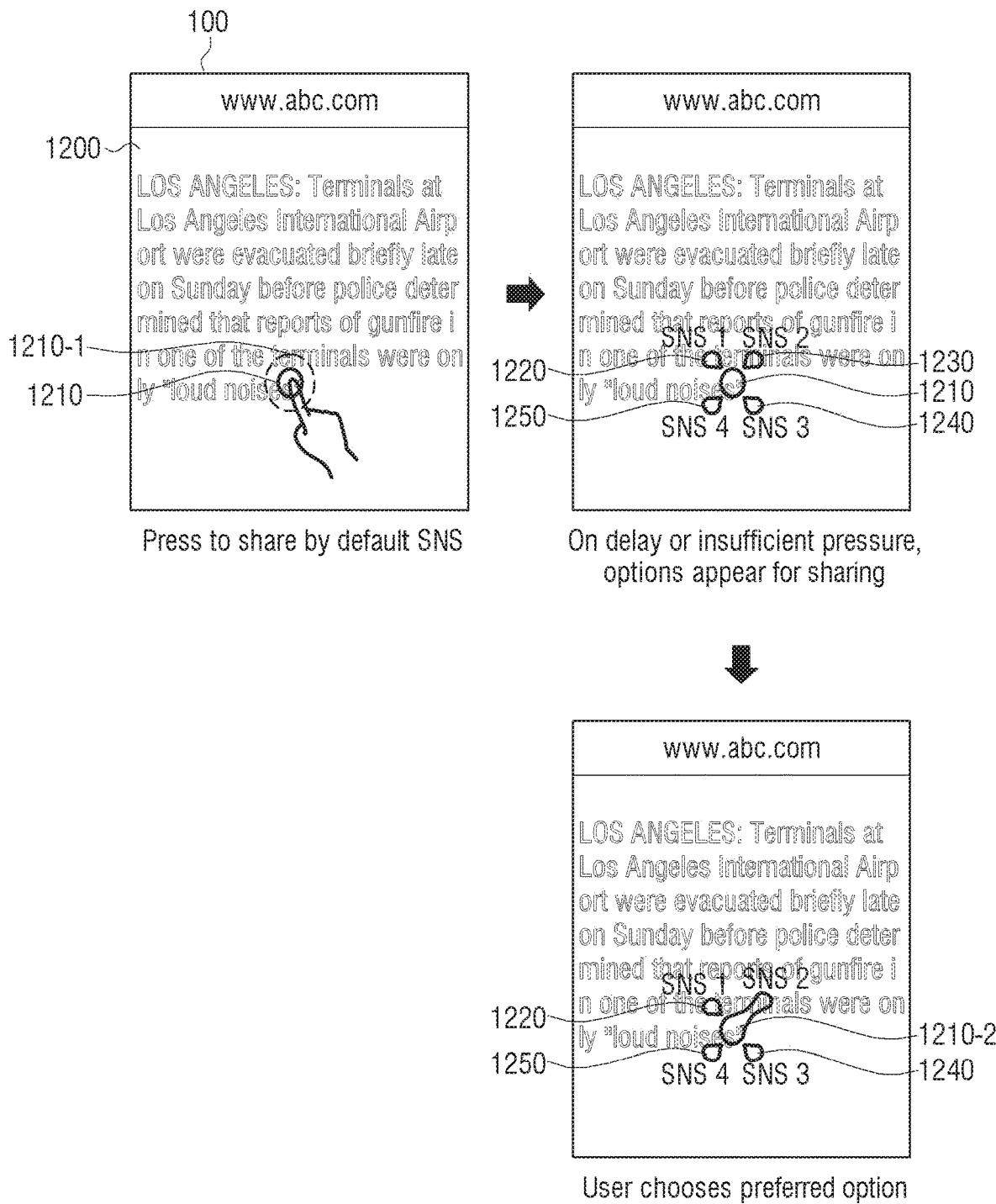
FIG. 12 illustrates various SNS displayed for sharing in accordance to an interaction using a fluid UI element in a browser according to various embodiments of the present disclosure.

FIG. 12 illustrates various SNS displayed for sharing a news content in accordance to an interaction using a fluid UI element in a browser according to various embodiments of the present disclosure.

The content can be, for example but not limited to news, a video, an audio, a multimedia, and the like.

Referring to FIG. 12, when the user desires to send a news content 1200 to another user using a default SNS, the user deforms a fluid UI element 1210 by applying pressure and crosses over the pressure (extent) threshold within a duration threshold 1210-1. However, if the user gets confused (ambiguity), the user does not cross over the pressure threshold within the duration threshold. Once the duration threshold is crossed, more options 1220, 1230, 1240, and 1250 are presented on the fluid UI element. The options are presented at predefined regular intervals as the user continues to spend more time on the interaction. If at any point of time, user disengages, then the deformation is restored. The plurality of options 1220, 1230, 1240, and 1250 (i.e., sharing the selected news through the SNS 1 to SNS 4) is sequentially presented on the fluid UI element 1210. Based on the user selected option 1230 (i.e., the user selects to share the news through the SNS 2), the deformed UI element 1210-2 binds with the selected item 1230 (i.e., the SNS 2). The selected news is shared to the other user through the SNS 2.

Figure 13:
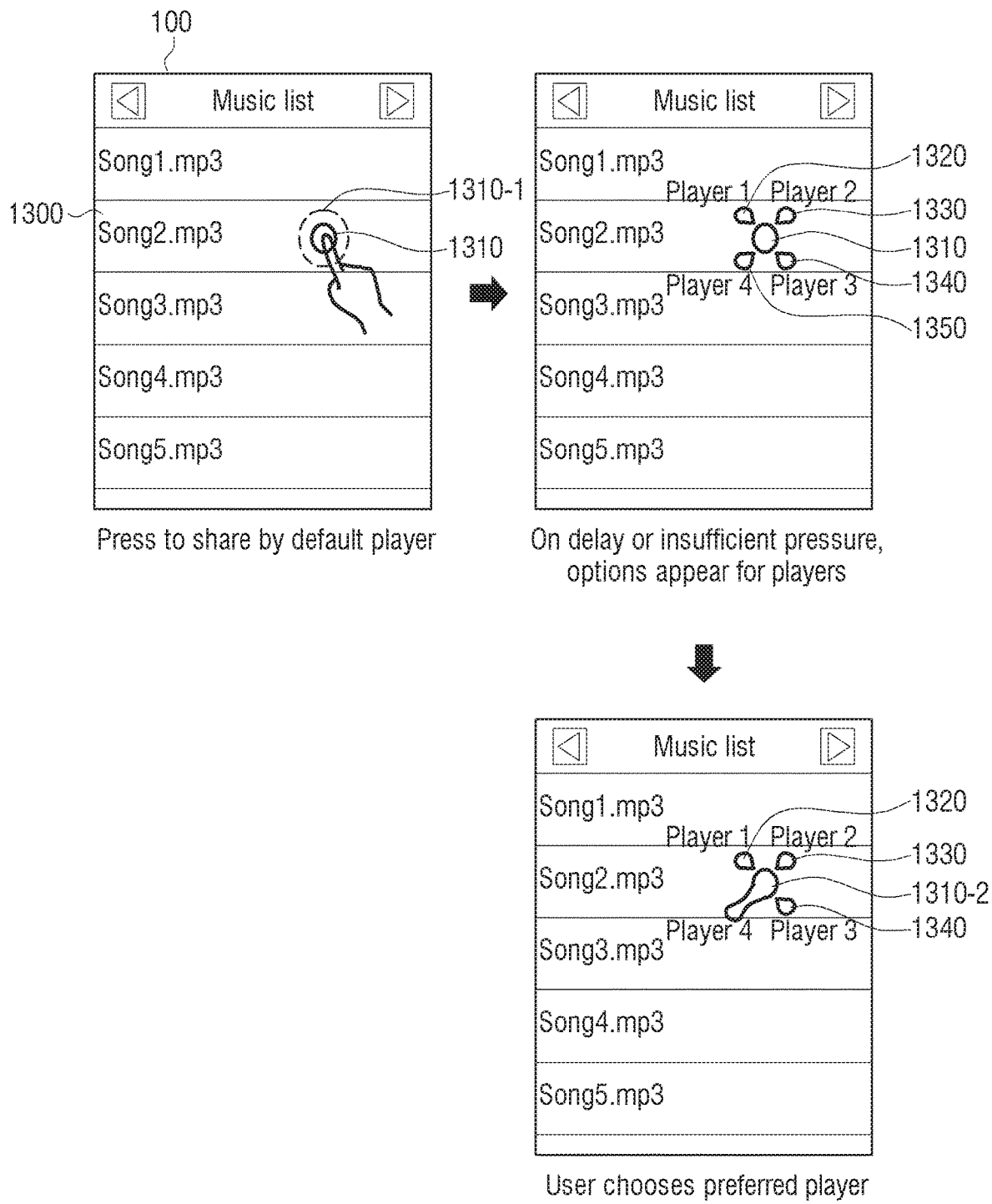
FIG. 13 illustrates various music players displayed in accordance to an interaction using a fluid UI element in a music list according to various embodiments of the present disclosure.

FIG. 13 illustrates various music players displayed in accordance to an interaction using a fluid UI element in a music list according to various embodiments of the present disclosure.

Referring to FIG. 13, when the user desires to select music 1300 to be played in a default player, the user deforms a fluid UI element 1310 by applying pressure and crosses over the pressure (extent) threshold within a duration threshold 1310-1. However, if the user gets confused (ambiguity), the user does not cross over the pressure threshold within the duration threshold 1310-1. Once the duration threshold is crossed, more options 1320, 1330, 1340, and 1350 are presented on the fluid UI element. The options 1320, 1330, 1340, and 1350 are presented at predefined regular intervals as the user continues to spend more time on the interaction. If at any point of time, user disengages, then the deformation is restored. The plurality of options 1320, 1330, 1340, 1350 (i.e., music players 1 to music players 4) is sequentially presented on the fluid UI element. Based on the user selected option 1350 (i.e., the user selects to play the selected song in player 4), the deformed UI element 1310-2 binds with the selected player 4 corresponding to option 1350.

Figure 14:
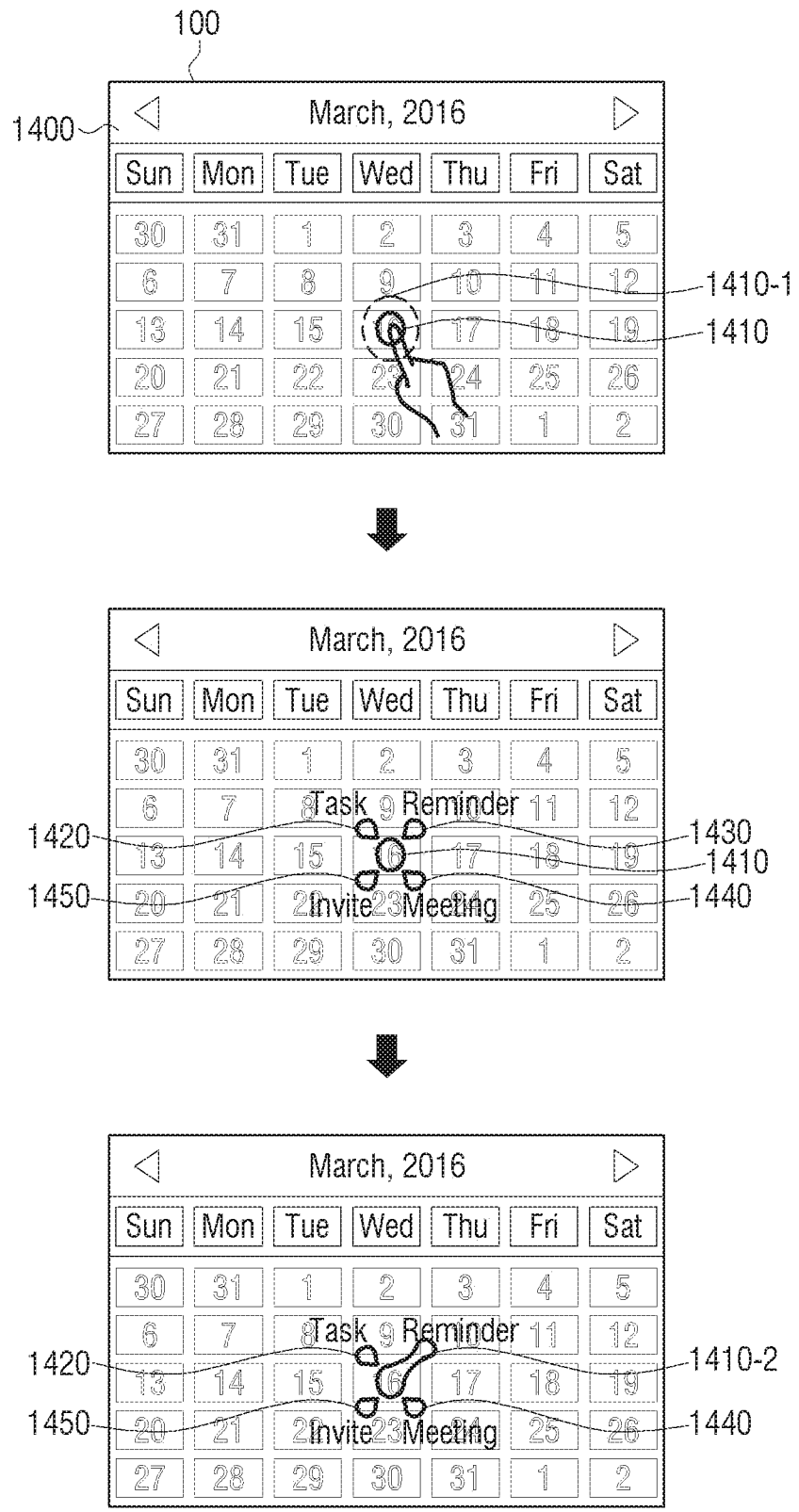
FIG. 14 illustrates various options displayed in accordance to an interaction using a fluid UI element in a calendar application according to various embodiments of the present disclosure.

FIG. 14 illustrates various options displayed in accordance to an interaction using a fluid UI element in a calendar application according to various embodiments of the present disclosure.

Referring to FIG. 14, when the user of the electronic device 100 desires to set a reminder in a calendar application 1400, the user deforms a fluid UI element 1410 by applying pressure and crosses over the pressure (extent) threshold within a duration threshold 1410-1. However, if the user gets confused (ambiguity), the user does not cross over the pressure threshold within the duration threshold 1410-1. Once the duration threshold is crossed, more options 1420, 1430, 1440, and 1450 are presented on the fluid UI element. The options 1420, 1430, 1440, and 1450 are sequentially presented at predefined regular intervals as the user continues to spend more time on the interaction. If at any point of time, user disengages, then the deformation is restored. The plurality of options 1420, 1430, 1440, and 1450, such as reminder, invite notification, meeting and task are sequentially presented on the fluid UI element. Based on the user selected option 1430 (i.e., the user select to set the reminder in the calendar application), the deformed UI element 1410-2 binds with the selected option 1430 (i.e., a reminder).

Figure 15:
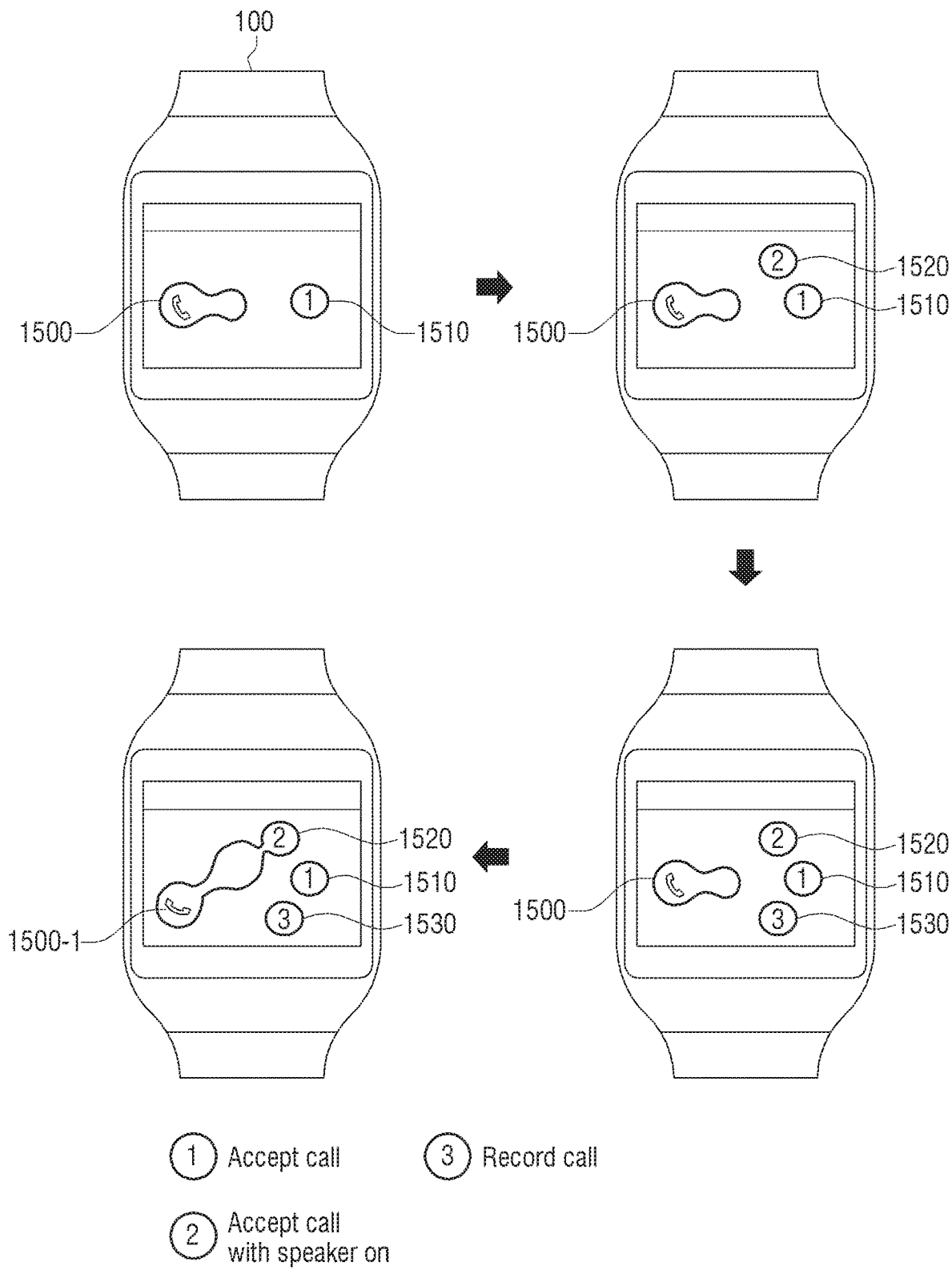
FIG. 15 illustrates various options displayed in accordance to an interaction using a fluid UI element in a wearable device according to various embodiments of the present disclosure.

FIG. 15 illustrates various options displayed in accordance to an interaction using a fluid UI element in a wearable device according to various embodiments of the present disclosure.

Referring to FIG. 15, the wearable device 100 referred herein is a smart watch. The user can attend the call directly by deforming a fluid UI element 1500 beyond the extent threshold and within the duration threshold. When the user has ambiguity in attending the call and desires additional options, then the user does not deform the fluid UI element till the extent threshold within the duration threshold. Once the duration threshold is crossed, the plurality of options 1510, 1520, and 1530 is sequentially presented in accordance with the extent of deformation of the fluid UI element 1500. The options 1510, 1520, and 1530 are presented at predefined intervals as the user continues to spend more time on the interaction. If at any point of time, user disengages, then the deformation is restored. When the user desires to select the option 1520, the user has to perform the action 1520 (i.e., attending the call along with the speaker ON option) on the UI. In response to the user selection 1520, the deformed UI element 1500-1 binds with the selected item 1520 (i.e., accept call with speaker ON option). The predefined interval refers to the presentation of options sequentially following a predefined time in which the option (s) is/are presented. For example, the accept call with speaker is presented in 2 milliseconds and record call option is presented in 2.20 milliseconds. The order of options 1510, 1520, 1530 of FIG. 15 and example of time are not limited thereto.

Figure 16:
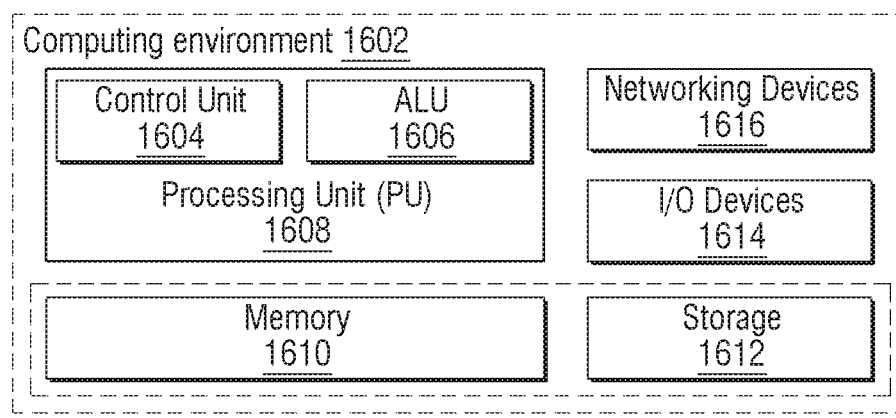
FIG. 16 illustrates a computing environment implementing a method for providing flexibility in an action confirmation using a fluid UI element according to various embodiments of the present disclosure.

FIG. 16 illustrates a computing environment implementing a mechanism for providing flexibility in an action confirmation using a fluid UI element according to various embodiments of the present disclosure.

Referring to FIG. 16, a computing environment 1602 comprises at least one processing unit 1608 that is equipped with a control unit 1604, an arithmetic logic unit (ALU) 1606, a memory 1610, a storage 1612, a plurality of networking devices 1616 and a plurality input output (I/O) devices 1614. The processing unit 1608 is responsible for processing the instructions of the technique. The processing unit 1608 receives commands from the control unit 1604 in order to perform its processing. Further, any logical and arithmetic operations involved in the execution of the instructions are computed with the help of the ALU 1606.

The overall computing environment 1602 can include multiple homogeneous or heterogeneous cores, multiple central processing units (CPUs) of different kinds, special media and other accelerators. The processing unit 1608 is responsible for processing the instructions of the technique. Further, the plurality of control units 1604 may be located on a single chip or over multiple chips.

The technique comprising of instructions and codes required for the implementation are stored in either the memory 1610 or the storage 1612 or both. At the time of execution, the instructions may be fetched from the corresponding memory 1610 or storage 1612, and executed by the processing unit 1608.

In case of any hardware implementations various networking devices 1616 or external I/O devices 1614 may be connected to the computing environment 1602 to support the implementation through the networking unit and the I/O device unit.

The various embodiments disclosed herein can be implemented through at least one software program running on at least one hardware device and performing network management functions to control the elements. The elements shown in the FIGS. 1, 2, 3, 4, 5A, 5B, 5C, 6, 7, 8, 9A, 9B, 9B, 10, 11, 12, 13, 14, 15, and 16 include blocks which can be at least one of a hardware device, or a combination of hardware device and software module.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a RAM, Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The foregoing description of the specific embodiments will so fully reveal the general nature of the various embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display configured to display a first user interface (UI) item, the first UI item being related to a function or a content of an application being executed;
    an inputter configured to receive a user input on the first UI item, the user input being moved from a first area on the first UI item to a second area of the display that is different from the first area; and
    at least one processor configured to:
        determine a duration and a moving distance of the user input,
        control the display to display at least one second UI item around a location of the user input based on the duration and the moving distance of the user input, the at least one second UI item being associated with at least one additional option related to the function or the content of the application corresponding to the first UI item, and
        based on the duration being equal to or greater than a predefined duration, control the display to deform and display a shape of the first UI item as a fluid having viscosity which is continued from a start area of selection of the first UI item to a last area.

2. The electronic device of claim 1, wherein the at least one processor is further configured to control the display to sequentially display the at least one second UI item according to the duration.

3. The electronic device of claim 2, wherein the at least one processor is further configured to control the display to:
    when one of the at least one second UI item is selected by the user, display the first UI item bound to the selected at least one second UI item, and when there are a plurality of the at least one second UI item, remove remaining second UI items not selected from among the plurality of second UI items.

4. The electronic device of claim 3, wherein the at least one processor is further configured to, when the first UI item approaches one of the plurality of the second UI items by the user, control the display to display a shape of a second UI item adjacent to the first UI item to be different from the remaining second UI items.

5. The electronic device of claim 1, wherein the at least one processor is further configured to:
   determine pressure which is input to the first UI item by a user command, and
   control the display to display the first UI item deforming to an icon in a fluid shape having viscosity based on the duration to receive the user command and the determined pressure.

6. The electronic device of claim 5, wherein the at least one processor is further configured to, when the duration is equal to or greater than a predefined duration and when the determined pressure value is equal to or greater than a predefined pressure value, control the display to display the first UI item deforming to an icon in a fluid type having viscosity so that the first UI item is expanded within a designated scope according to the duration.

7. The electronic device of claim 6, wherein the at least one processor is further configured to, when an outline of the first UI item reaches the designated scope, control the display to display the at least one second UI item sequentially around the first UI item which is deformed to the fluid type according to the duration.

8. The electronic device of claim 7, wherein the at least one processor is further configured to:
   when one of the at least one second UI item is selected by the user, control the display to display the first UI item bound to the selected second UI item, and
   when there are a plurality of the at least one second UI items, remove remaining second UI items not selected from among the plurality of second UI items.

9. The electronic device of claim 1, wherein the at least one processor is further configured to, when the duration is equal to or greater than a first threshold value and when the moving distance is equal to or greater than a second threshold value, control the display to display a UI to edit a menu item corresponding to the first UI item around the first UI item where a user command is input.

10. A method comprising:
    displaying a first user interface (UI) item, the first UI item being related to a function or a content of an application being executed;
    receiving a user input on the first UI item, the user input being moved from a first area on the first UI item to a second area of the display that is different from the first area;
    determining a duration and a moving distance of the user input;
    displaying at least one second UI item around a location of the user input based on the duration and the moving distance of the user input, the at least one second UI item being associated with at least one additional option related to the function or the content of the application corresponding to the first UI item; and
    based on the duration being equal to or greater than a predefined duration, deforming a shape of the first UI item as a fluid having viscosity which is continued from a start area of selection of the first UI item to a last area.

11. The method of claim 10, wherein the displaying of the first UI item comprises:
    sequentially displaying the at least one second UI item around the first UI item according to the duration.

12. The method of claim 11, wherein the displaying of the first UI item comprises:
    selecting one of the at least one second UI item by the user;
    displaying the first UI item bound with the selected second UI item; and
    removing, when there are a plurality of the at least one second UI item, remaining second UI items not selected from among the plurality of second UI items.

13. The method of claim 12, wherein the displaying of the first UI item comprises:
    displaying, when the first UI item approaches one of the plurality of the second UI item by the user, a shape of a second UI item adjacent to the first UI item to be different from remaining second icons.

14. The method of claim 10, further comprising:
    determining pressure which is input to the first UI item by the user command; and
    displaying the first UI item deforming to an icon in a fluid shape having viscosity based on the duration to receive a user command and the determined pressure.

15. The method of claim 14, wherein the displaying of the first UI item comprises:
    when the duration is equal to or greater than a predefined duration and the determined pressure value is equal to or greater than a predefined pressure value, displaying the first UI item deforming to an icon in a fluid type having viscosity so that the first UI item is expanded within a designated scope according to the duration.

16. The method of claim 15, wherein the displaying of the first UI item comprises:
    sequentially displaying, when an outline of the first UI item reaches a threshold value in the designated scope, the at least one second UI item around the first UI item according to the duration.

17. The method of claim 16, wherein the displaying of the first UI item comprises:
    selecting one of the at least one second UI item by the user;
    displaying the first UI item bound with the selected second UI item; and
    removing, when there are a plurality of the at least one second UI items, second UI items not selected from among the plurality of second UI items.

18. The method of claim 10, wherein the displaying of the first UI item comprises:
    when the duration is equal to or greater than a first threshold value and the moving distance is equal to or greater than a second threshold value, displaying a UI to edit a menu item corresponding to the first UI item around the first UI item where the user command is input.

19. The electronic device of claim 1, wherein the number of the at least one second UI item is determined based on the duration.

20. The electronic device of claim 1,
    wherein the viscosity of the fluid is related to an importance of the function or the content of the executed application, and
    wherein the at least one processor is further configured to control to display the shape of the first UI item which is continued from the start area to the last area, as the fluid having the viscosity is determined based on the predefined duration and the predefined moving distance.

\* \* \* \* \*